(12) United States Patent
Sert et al.

(10) Patent No.: US 11,586,942 B2
(45) Date of Patent: Feb. 21, 2023

(54) GRANULAR BINARIZATION FOR EXTENDED REALITY

(71) Applicant: Accenture Global Solutions Limited, Dublin (IE)

(72) Inventors: Onur Can Sert, Dublin (IE); Perikles Rammos, Dublin (IE); Md Faisal Zaman, Dublin (IE)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 917 days.

(21) Appl. No.: 16/446,205

(22) Filed: Jun. 19, 2019

(65) Prior Publication Data

US 2020/0401912 A1 Dec. 24, 2020

(51) Int. Cl.
| | | |
|---|---|---|
| *G06N 5/04* | (2006.01) | |
| *G06N 20/00* | (2019.01) | |
| *G06F 16/28* | (2019.01) | |
| *G06F 3/14* | (2006.01) | |
| *G06F 3/01* | (2006.01) | |

(52) U.S. Cl.
CPC ............ *G06N 5/04* (2013.01); *G06F 3/011* (2013.01); *G06F 3/14* (2013.01); *G06F 16/285* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 10,331,399 B2 | 6/2019 | Alsina et al. | |
| 11,120,353 B2 | 9/2021 | Olabiyi et al. | |
| 2013/0230209 A1* | 9/2013 | Hashimoto | G06T 7/136 382/103 |
| 2016/0284125 A1* | 9/2016 | Bostick | G06F 3/012 |
| 2017/0109656 A1* | 4/2017 | Cook | G06N 5/02 |
| 2018/0053093 A1 | 2/2018 | Olabiyi et al. | |

(Continued)

FOREIGN PATENT DOCUMENTS

| | | |
|---|---|---|
| CN | 106251889 A | 12/2016 |
| JP | 2017-003975 A | 1/2017 |
| JP | 2018-028906 A | 2/2018 |

OTHER PUBLICATIONS

Joo, Javier Montenegro. "Heuristic threshold for histogram-based binarization of grayscale images." Industrial Data 17.1 (2014): 97-100. (Year: 2014).*

(Continued)

*Primary Examiner* — Daniel T Pellet

(74) *Attorney, Agent, or Firm* — Crowell & Moring LLP

(57) ABSTRACT

A system may receive events derived from historical sensor data. The system may generate repeat event records based on the events. The system may cluster the repeat event records into repeat event clusters. The system may determine filter ranges for the repeat event clusters. The system may generate a binarization filter comprising instructions to generate a binary sequence indicative of at least one of the filter ranges. The system may execute the binarization filter to generate binary sequences corresponding to the repeat event records, respectively. The system may train a prediction model based on the binary sequences. The system may deploy the binarization filter and the prediction model to a real-time platform.

20 Claims, 13 Drawing Sheets

(56) References Cited

U.S. PATENT DOCUMENTS

2018/0053351 A1* 2/2018 Anderson ............. G06T 19/006

OTHER PUBLICATIONS

Office Action in Japanese Application No. 2020-101508, including English translation, date drafted Jul. 13, 2021, dated Aug. 10, 2021, 8 pages.
Perikles Rammos et al., U.S. Appl. No. 16/266,274, filed with the U.S. Patent and Trademark Office on Feb. 4, 2019, pp. 1-44, not yet published.
Saad M. Ismail et al., "Statistical Binarization Techniques for Document Image Analysis," Journal of Computer Science, dated Mar. 1, 2018, pp. 23-36, vol. 14, Issue 1, published online by Science Publications at URL https://thescipub.com/pdf/10.3844/icssp.2018.23.36.

* cited by examiner

US 11,586,942 B2

GRANULAR BINARIZATION FOR EXTENDED REALITY

TECHNICAL FIELD

This disclosure relates to extended reality and, in particular, to machine learning enhancements to extended reality.

BACKGROUND

Extended Reality may include real-and-virtual combined environments and human-machine interactions generated by computer technology. A human's interaction in a physical, virtual or combined space may be enhanced through machine-generated information that is designed to augment a user's experience.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
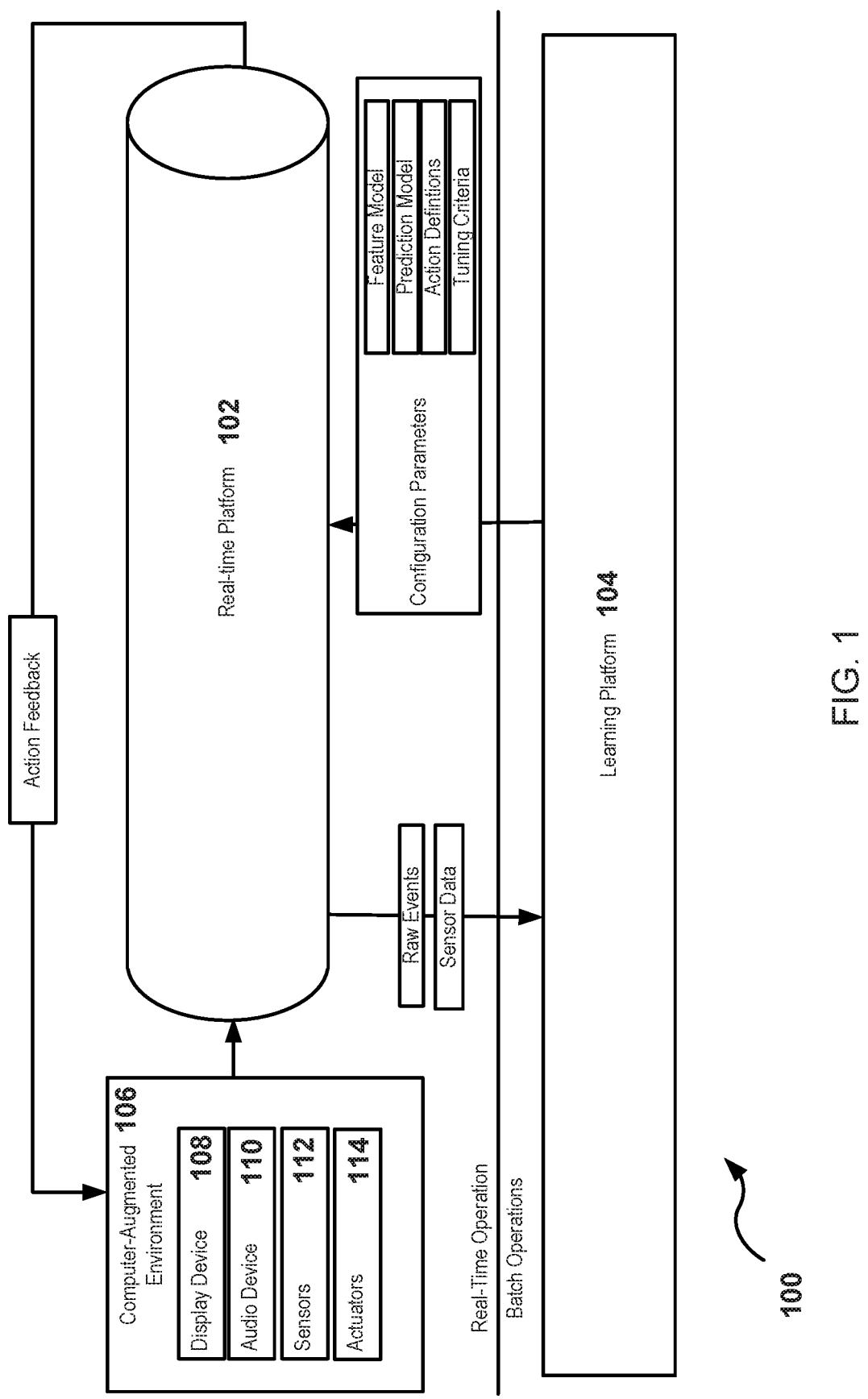
FIG. 1 illustrates an example of a real-time feedback system.

A computer-augmented environment may include an environment where sensors collect information to enhance a physical and/or virtual space. A human's interaction in a physical, virtual or combined space may be enhanced through machine-generated information that is designed to augment a user's experience. For example, a computer-augmented environment may include extended reality (XR) where real-and-virtual combined environments and human-machine interactions are generated by computer technology based on sensor data acquired from a physical space. Extended reality may include, for example, augmented reality (AR), augmented virtuality (AV), virtual reality (VR), mixed reality (MR). Computer-augmented environments may rely on real-time data acquisition and processing in order to generate information based on changes in a physical space, a virtual space, or both. In other examples, the commuter augment environment may access or include other systems, such as drones, self-driving cars, conveyor belts, etc.

Computer-augmented environments may derive information from sensors that provide a rich source of information about an environment. Computer-augmented environments may provide information to a user based on the current or historical state of an environment, but inadequately provide feedback based on possible future states. Moreover, the existing systems fail to efficiently and accurately identify repetition behavior that leads to user error. Large quantities of data and high processing demands of computer-augmented sensor data may inhibit fluid generation and display of interactive content for a user of the computer-augmented environment.

The system and methods described herein provide technical advancements for computer augmented environments and related systems. By way of introductory example, a learning platform may receive events derived from historical sensor data. The events may be associated with user tokens of users for a computer argument environment. In some examples, the historical sensor data may be generated by the computer-augment environment. The learning platform may generate repeat event records based on the events. Each of the repeat event records may be associated with at least one of the user tokens. The repeat event records may include occurrence frequency metrics. Each of the occurrence frequency metrics may be indicative of a quantity of occurrences of repeated actions captured by a sensor in the computer-augmented environment. The learning platform may cluster, based on a clustering framework, the repeat event records into repeat event clusters. The repeat event cluster may include respective groups of repeat event records. The learning platform may determine filter ranges for the repeat event clusters. The filter ranges may include separate numerical ranges for each of the repeat event clusters. The learning platform may generate a binarization filter comprising instructions to generate a binary sequence indicative of at least one of the filter ranges. The learning platform may execute the binarization filter to generate binary sequences corresponding to the repeat event records, respectively. The learning platform may train a prediction model based on the binary sequences. The prediction model may be configured to identify a subsequent event based on at least one of the binary sequences. The learning platform may deploy the binarization filter and the prediction model to a real-time platform in communication with the computer-augmented environment.

In another example of the systems and methods described herein, a real-time platform may receive deployment parameters comprising a binarization filter and a prediction model. The binarization filter may include filter ranges and the prediction model may be trained based on associations between binary sequences and subsequent events. The real-time platform may receive real-time sensor data generated by a computer-augmented environment. The real-time platform may determine a repeat event record based on the real-time sensor data. The repeat event record may include an occurrence frequency metric. The occurrence frequency metric may represent a number of times an event derived from the real-time sensor data is repeated. The real-time platform may generate, based on the binarization filter and the occurrence frequency metric, a binary sequence indicative of the occurrence frequency metric being included in at least one of the filter ranges. The real-time platform may determine, based on the prediction model and the binary sequence, at least one of the subsequent events is associated with the binary sequence. The real-time platform may identify an action message associated with the at least one of the subsequent events. The real-time platform may cause the computer-augmented environment to display the action message before the at least one of the subsequent events occurs.

An example of a technical advancement provided by the systems and methods described herein may be that the system may aggregate repeat event frequencies into to multi-modal distributions that arise from collecting data from multiple users. A binarization filter may generate binary sequence features that represent at least one of the multi-model distributions. Accordingly, the binary sequence features are high-granularity by indicating whether an event has occurred and the number of times it has occurred (i.e. within a range). The system may train and/or infer future events (e.g. adverse or dangerous user behavior) based on the binary sequence features. The system may cause a computer-augmented environment to display or provide feedback to a user before the future event occurs.

Another technical advancement provided by the systems and methods described herein may be that the learning platform may deploy and update refined binarization filters and prediction models. For example, the learning platform may enhance binarization models and prediction models based on sensor data and/or event data generated by multiple computer-augmented environments. The learning platform may refine the binarization filters and retrain prediction models. The learning platform may tailor a particular set of binarization filters and prediction models based on the users and/or event types that are relevant to a computer-augmented environment or real-time platform. Accordingly, the learning platform may provide a library of binarization filters and prediction models that may be selectively chosen for a particular real-time platform. Additional or alternative technical advancements are made evident in the system and methods described herein.

FIG. 1 illustrates an example of a real-time feedback system 100. The system 100 may generate insights and actions from extended reality data. The system 100 may derive features based on the acquired data. The features may be inputted into multiple analytics models. For example, the analytics models may be trained based on the features. The system 100 may access the trained models to generate predictions from the live stream and communicate feedback to users in real time. The system 100 may learn from past users to improve the performance of current and future users.

The system 100 may include a real-time platform 102, a learning platform 104, and/or a computer-augmented environment 106. The real-time platform 102 may receive real-time sensor data and/or raw events originated by the computer-augmented environment 106. The real-time platform 102 may generate action feedback for the computer-augmented environment 106. The action feedback may be indicative of predicted user actions. For example, the action feedback may include information communicated to a user via one or more device, such as a display device, a speaker, an actuator that provides physical feedback or some other device that conveys information through visual, physical, or audible feedback. In one example, the action feedback may include a message generated in response to predicting one or more events. In another example, the action feedback may include an instruction to activate an actuator, such as a haptic actuator, which causes a user to feel physical sensation.

The real-time platform 102 may derive events from the computer-augmented environment 106 over one or more time spans. The events may be filtered by feature selection and applied as an input to a trained prediction model. Event reduction may utilizes a correlation investigation to keep the most important features for prediction and/or to reduce computation time. The trained prediction model may utilize the selected events as input to infer future events (i.e. the user's future actions). These predicted events, or messages mapped to the events, may be passed back to the computer-augmented environment 106 where recommendations, warnings or guidelines may be provided to the user in real-time.

The learning platform 104 may train and/or generate models, logic, settings, and other parameters for the real-time platform 102. For example, the learning platform 104 may deploy and/or configure the real-time platform 102 (or multiple instances of real-time platforms). The learning platform 104 communicate configuration parameters to the real-time platform 102. The configuration parameters may include models, logic, settings, and other information accessible to the real-time platform 102 to analyze sensor data, predict events, generate action feedback, reduce events, improve processing time, and/or perform other operations contemplated herein. The configuration parameters may be tailored to a particular computer-augmented environment, XR scenario, and/or user of the computer-augmented environment 106. Alternatively or in addition, the configuration parameters may be tailored to increase the performance of the real-time platform 102 in terms of processing speed, memory usage, throughput, latency, and other performance measurements.

In some examples, the configuration parameters may include one or more of a feature model(s), a prediction model(s), a filter criteria(s), an action mapping(s). In general, the feature model may be trained to derive events based on sensor data and/or raw event information. The prediction model may predict events based on derived events, raw events, and/or sensor data. The action mappings may map predicted events to messages to include in the action feedback. The filter criteria may include information responsive by the real-time platform 102 to control how information flows into, within, and out of the real-time platform 102. Alternatively or in addition, the filter criteria may reduce a number of events derived or predicted by the real-time platform. For example, that the real-time platform 102 may select, based on the filter criteria, information that should be evaluated and information that should be ignored through various stages of the real-time platform 102. The feature model, the prediction model, the action mapping, and the filter criteria is described in reference to FIGS. 2-5 below.

The learning platform 104 may receive sensor data and/or raw events generated by the computer-augmented environment 106 and/or the real-time platform 102. In some examples, the real-time platform 102 may reformat the sensor data to a predetermined format that is compliant with the learning platform 104. For example, the predetermine format may include data structure definitions, or some other structure that can be parsed by the learning platform 104 (for example through an API call). During operation, multiple real-time platforms may forward information to the learning platform 104. The learning platform 104 may aggregate the data and refine models, logic, and other parameters accessed by the real-time platform 102. Thus, refinement and improvement of the real-time platform 102 may occur offline and, in some examples, concurrent with operation of the real-time platform 102.

The computer-augmented environment 106 may provide extended reality. Extended reality may include, for example, augmented reality (AR), augmented virtuality (AV), and/or virtual reality (VR). The computer-augmented environment 106 may include one or more display device 108, audio device 110, sensor 112 and/or actuator 114. The display device 108 may include, for example, a headset that displays visual information to its wearer. Alternatively or in addition, the display device may income a hardware or interface configured to receive and display visual content. An audio device, may include playback hardware configured to emit audible sound based on audio information. The actuator device may provide physical feedback, such as haptic feedback, to a user. A sensor may include a device that that detects and/or measures physical properties. The sensor may include, for example, a haptic sensor, a biometric sensor, a microphone, a camera, a motion sensor, a gyroscope, or any other device that detects properties of a physical space or of a user. The haptic sensor may include, for example, a tactile sensor that measures an amount of force applied to surface by a user. The biometric sensor may include, for example, a sensor that detects a physical characteristic or state of a user that is unique to the user.

In some examples, the computer-augmented environment 106 may include devices that determine raw events based on the sensor information (or other information), provide application programming interfaces to interact with the devices of computer-augmented environment, and/or communicate sensor data or raw events. The computer-augmented environment 106 may include devices that stream information based on one or more sessions established with a communications protocol such as APACHE Kafka or some other suitable messaging service. The real-time platform and/or the learning platform 104 may receive information from the computer-augmented environment 106, or devices included in the computer-augmented environment 106.

As described herein, sensor data may refer to information received by a sensor and/or information derived from signals provided by a sensor. For example, sensor data may include measurements of physical properties or physical changes. In some examples, the sensor data may include movement data. Alternatively or in addition, the sensor data may include locations of a physical object, such as a human body part or an object in a physical space. Alternatively or in addition, the sensor data may include audio and video information. In some examples, the sensor data may include a biometric response of a user, such as heart rate, pupil dilation etc.

As described herein, an event refers to a feature derived from sensor data or other events. The event may represent a classification or grouping of sensor data or events. Alternatively or in addition, the event may represent a sequence, pattern, timing, or change of sensor data or events. In other examples, an event may include satisfaction of a condition or step in a process based on criteria, rules, or logic.

Throughout the discussion herein events may be qualified as raw events, derived events and/or predicted events. A raw event may include an event derived from sensor data outside of the real-time platform 102 and/or the learning platform 104. For example, the computer-augmented environment 106, or some other system, may generate the raw events. A derived event may include an event derived based on sensor data, raw events, other derived events, and/or other information. For example, the derived event may include an event derived by the real-time platform 102 and/or the learning platform 104 using various models, statistical analysis, machine learning, or other analysis. A predicted event may include an event forecasted based on one or more derived event, raw event, and/or sensor data.

Figure 2:
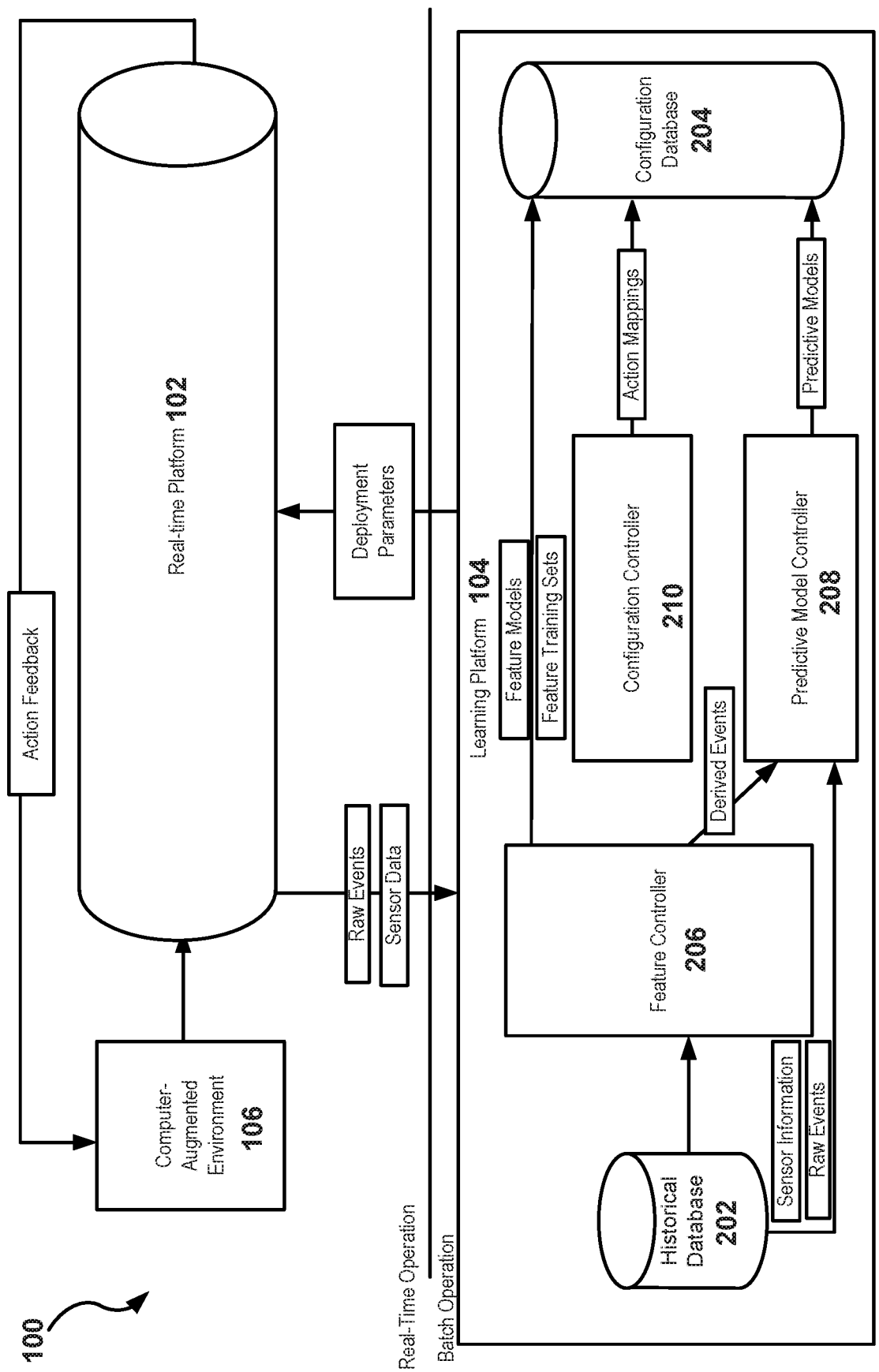
FIG. 2 illustrates an example of a learning platform.

FIG. 2 illustrates an example of the learning platform 104. The learning platform 104 may generate models, logic, settings, and other parameters for the real-time platform 102. For example, the learning platform 104 may provide the real-time platform 102 with configuration parameters that cause the real-time platform 102 to derive events from sensor data, predict events, and/or generate action feedback for the computer-augmented environment 106. The learning platform 104 may facilitate the generation, deployment, and/or configuration of the real-time platform 102, or components thereof.

The learning platform 104 may receive sensor data and/or raw events from one or more computer-augmented environment 106. Alternatively or in addition, one or more real-time platforms may be configured to forward information from a computer-augmented environment 106 to the learning platform 104. For example, a dedicated client configured in the computer-augmented environment 106 and/or real-time platform 102 may consume data and push the data to learning platform 104.

The learning platform 104 may include a historical database 202. The historical database 202 may include an organized set of data stored and accessed electronically. The historical database 202 may store sensor data, raw event information, or other information originated by the computer-augmented environment 106 and/or the real-time platform 102. The information stored in the historical database 202 may be accessed by the learning platform 104 in batch while the real-time platform 102 processes sensor data in real time.

The learning platform 104 may include a configuration database 204. The configuration database 204 may include an organized set of data stored and accessed electronically. The configuration database 204 may include the models, logic, and/or parameters generated or updated for the real-time platform 102 (or multiple deployments of real-time platforms). The configuration database 204 may include a repository of information that is associated with various types of computer-augmented environments, types of real-time platforms, user identifiers, account identifiers, etc. The learning platform 104 may access information from the configuration database 204 when generating, deploying, and/or configuring the real-time platform 102, or components thereof.

The learning platform 104 may include a feature controller 206. The feature controller 206 may access historical data from the historical database 202. The feature controller 206 may organize the information into feature training sets. A feature training set may include mappings between input and output features. For example, the feature training model may associate sensor data with event data. The mappings may be human or machine generated. Over time, the mappings may be updated to improve the accuracy and confidence of the feature model generated by the feature training set.

A feature model may include conditions, statistical models, and/or logic configured to perform feature extraction. By way of example, the feature model may include a learned or inferred function based on supervised learning. Examples of the feature model may include rules-based, geometrical, or simple counting methods. In operation, the feature model may be accessed to derive events based in input sensor data and/or raw events. Events are generated in order to summarily describe the behavior of the user.

By way of example, an event may capture or quantify the focus of a user. For example, the event may include may include an occurrence (or a number of accordance's of) looking (or not looking) at objects of interest. For deriving such an event, a list of objects of interest, along with their coordinates, is given to the feature model as an input (raw event), and the field of view of the user is extracted at every frame from the sensor data (i.e the VR/AR headset). Combining these two sources can give us at every frame whether an object of interest is within the field of view of the user or not.

Another example of an event is attempting to use controls that are not applicable, i.e. pressing a trigger button while not holding anything, or trying to grab something that is not in the proximity. For this derived event only the sensor data are analyzed.

In some examples, the feature model and/or the feature training set may be tailored for a particular computer-augmented environment, a type of sensor data, and/or a class of events. For example, sensor data received by the learning platform 104 may be associated with a sensor data type. The sensor data type may indicate the type of a sensor, the location of the sensor, or the type of information received by the sensor (e.g., movement data acquired from a sensor attached to a hand). Alternatively or in addition, the sensor data may be associated with a type of computer-augmented environment 106. The type of computer-augmented environment 106 may be indicative of scenario (e.g. a chemical laboratory, a manufacturing process, a driving experience, etc) that the computer-augmented environment 106 augments. In some examples, the feature training set may be configured to include data from only certainly types of sensor data, XR scenarios, and/or class of events.

The feature controller 206 may apply a feature model to determine one or more derived events based on the historical data from the historical database 202. As previously discussed, a derived event refers to an event derived from analysis of sensor data, raw events, or other information. A derived event may be indicative of movement data inside a physical space. By way of example, a derived event may include a collision between objects, hands jittering, dropping an item, touching/picking up a wrong item, facing away from an item of interest, or any other classification of sensor data.

The learning platform 104 may include a prediction model controller 208. The prediction model controller 208 may generate a prediction model based on statistical investigation analytics, machine learning, and/or conditional logic. For example, the prediction model controller 208 may identify causal or correlated relationships between events. The prediction model may generate a prediction model base on the causal or correlated relationships between events.

A prediction model may include any model or data aggregation, which a conditional chance of an event (or events) occurring in the future given that a previous event or events has occurred. The prediction model may include statistical summaries built on historic data and/or stored expert information. In some examples, the prediction model may predict an event is likely to occur in response to a user's movement or trajectory. The model may be based on averaging historical data and/or modelling the trajectory of an average user. Alternatively or in addition, the model may be personalized, considering individual sensor data and/or movement data for a particular user. In other examples, the prediction model may include trained associations between one or more binary sequences and one or more events. The binary sequences may represent repetitious user behavior. Additional explanation regarding the generation of binary sequences and training the prediction model based on the binary sequences is found the description in reference to FIGS. 8-13.

In some examples, the prediction model may identify events that are associated with each other based on the respective time the events that occur. For example, the prediction model controller 208 may determine, based on statistical analysis and/or machine learning frameworks, that if Event A happens at time t, Event B is likely to happen at time t+1. Alternatively or in addition, the prediction model controller 208 may determine a confidence that a first event or first sequence of events occurs after a second event or second sequence of events.

To generate the prediction model, the learning platform 104 may determine a separation time and measure a confidence of events having occurred before the separation and after the separation. The investigation analytics may include confidence measurements of multiple events and their sequential occurrence. Alternatively or in addition, the system 100 may generate confidence measurements of events appearing sequentially. The confidences may include a statistical metric, such as correlation or probability. The learning platform 104 may compile the confidences, and identifiers of the corresponding events into the predictive model.

In some examples, the prediction model controller 208 may generate a correlation matrix. The correlation matrix may include metrics indicative of a confidence of a second event occurring after a first event. Table 1 illustrates an example of a correlation matrix. In the example illustrated in Table 1, Event C is very likely (90%) to occur after an Event D. The correlation matrix enables the system 100 to predict the occurrence of an event in real-time. For example, if the system 100 derives or gains access to the 'prior' event, it may predict the probabilities of 'subsequent' events, aka the event that are about to happen.

TABLE 1

Correlation Matrix

|  |  | Subsequent | | | |
| --- | --- | --- | --- | --- | --- |
|  |  | EVENT A | EVENT B | EVENT C | EVENT D |
| Prior | EVENT A | 30 | 20 | 20 | 40 |
|  | EVENT B | 40 | 5 | 3 | 10 |
|  | EVENT C | 10 | 0 | 60 | 10 |
|  | EVENT D | 50 | 0 | 90 | 30 |

The correlation matrix may be an example of a prediction model. More generally, the prediction model may include event mappings. An event mapping may include a mapping between one or more events. For example, an event mapping may include a mapping between a first event (such as event A) and a second event (such as event B). The event mapping may include a confidence metric (such as 20%) that measures the likelihood of the second event (or events) occurring after the first event (or events).

The filter criteria may enable the learning platforms and/or the real-time platform 102 to receive, evaluate, and/or predict only the information that is relevant for a particular computer-augmented environment. The filter criteria may include information that causes the real-time platform 102 to select certain data for input to the real-time platform 102, the feature model, the predictive model. Alternatively or in addition, the filter criteria may include logic that causes the real-time platform 102 to only predict certain events or output certain messages. In some examples, the filter criteria may conclude identifiers of authorized (or unauthorized) sensor devices, sensor data, communication channels, or other sources of sensor data. Alternatively or in addition, the filter criteria may include identifiers of authorized (or unauthorized) events, prediction mappings, and/or action mappings. As described in reference to FIG. 3, the real-time platform 102 may control the follow if information into, within, and out of the real-time platform based on the filter criteria.

In some examples, the event filter may be generated or configured based on confidence thresholds. A confidence threshold may include a threshold value that establishes the minimum amount of confidence for event predictions. For example, the confidence threshold may be set to 70%. Accordingly, the prediction mapping (Event D, Event C, 90%), which is shown in Table 1, would be selected from the correlation matrix.

The confidence threshold may be tuned for a particular implementation. Lower thresholds (e.g. 40% or lower) may result in a greater number of predictions at the cost of less accurate predictions. While the predictions may be less accurate, low confidence thresholds may increase the chances of warning a user of impending danger or sending some other action feedback to the user in response to a predicted event. Alternatively or in addition, high confidence thresholds (e.g. 80% or greater) may decrease the number of false predictions and increase confidence in predicted events. The optimal confidence threshold may depend on the particular computer-augmented environment and/or user, and the confidence threshold may be adjusted over time.

Confidence thresholds may be established based on a type of computer-augmented environment, a user, types of events, and/or action feedback. In an example, the type of XR session may include a chemical laboratory overlay where information is displayed to a user to assist in the preparation of chemicals in a laboratory. Because inherent danger involved in mixing chemicals, the confidence threshold(s) may be configured at 40%, or some other suitable value, in order to warn a user to avoid potential errors (inappropriately mixing volatile chemicals, performing steps out of order, etc). Alternatively or in addition, multiple confidence thresholds may be tuned based on the predicted events and/or action feedback. For example, an identifier of a predictive event or an identifier of an action feedback may be associated with a confidence threshold. For example, some action feedback associated with non-critical events may be associated with a high prediction confidence while other action feedback, such as safety warnings for dangerous events, may be associated with a lower confidence threshold.

The system 100 may further include a configuration controller 210. The configuration controller 210 may generate an action mapping. An action mapping may include a mapping between a predicted event (or multiple predicted events) and an action message. For example, the action mapping may include a table, or some other suitable data structure, that maps one or more predicted event identifier to one or more action message identifier. Table 2 illustrates an example of an action mapping.

TABLE 2

| XR Scenario | Predicted Event | Action Message |
|---|---|---|
| Chemistry Lab | Incorrect mixing of chemicals | Instruction: Display warning on headset<br>Instruction: Induce haptic feedback to user's hand |

TABLE 2-continued

| XR Scenario | Predicted Event | Action Message |
|---|---|---|
| Vehicle Driving | User falling asleep while driving | Instruction: Play audible noise through speaker |

An action message may cause the computer-augmented environment 106 (or component of the computer-augmented environment 106) to interact with a user. The action message may include information that is communicated to the user in via the computer-augmented environment 106. The action message may follow a data format native to the computer-augmented environment 106. The action message may cause the computer-augmented environment 106 to display information on a video device, playback audio through a playback device, engage actuators, such as a haptic actuator, or perform any other action that causes the user to receive sensory information. In some examples, the action message may include an instruction, an API call and/or a message formatted according to formatting standards governed by the computer-augmented environment 106. Thus, the learning platform 104 may store various actions mappings for the same type of predicted event, each of the mapping tailored for a separate deployment of the real-time platform that is tailored for a particular computer-augmented environment.

Figure 3:
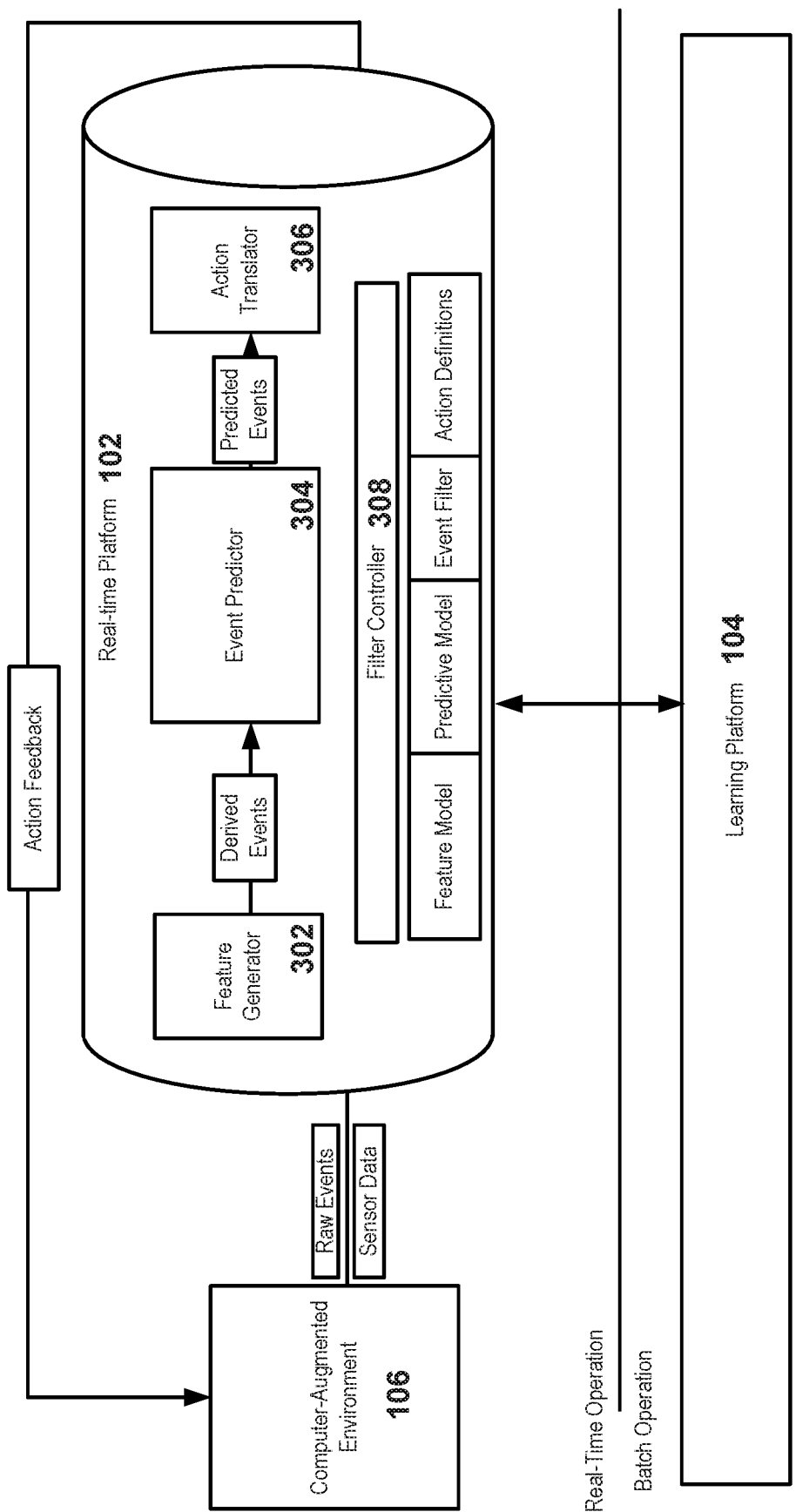
FIG. 3 illustrates an example of a real-time platform.

FIG. 3 illustrates an example of the real-time platform 102. The real-time platform 102 may include a feature generator 302. The feature generator 302 may determine events based on sensor data and/or events provided by the computer-augmented environment 106. For example, the feature generator 302 may derive events based on the feature model 110. As discussed in reference to FIG. 2, the feature model may include logic that identifies a derived event based on input data, such as sensor data. The feature generator 302 may access the feature model to generate events based on sensor data and/or raw events communicated to the real-time platform 102.

The feature model may be configured on the real-time platform 102 by the learning platform 104. For example, the real-time platform 102 may receive the feature model during deployment. Alternatively or in addition, the real-time platform 102 may receive new or updated feature models from the learning platform 104 as the feature model is improved.

The real-time platform 102 may further include an event predictor 304. The event predictor 304 may predict one or more events based on a derived event, raw events, and/or sensor data. The event predictor 304 may access a prediction model to predict events. As discussed in reference to FIG. 2, the prediction model may include predictive mappings, logic, rules, or other information that cause the event predictor 304 to identify an output event based on one or more input events or sensor data. The output event may be the prediction of an event occurring in response to the input event and/or sensor data. The output event may be associated with a confidence metric.

The real-time platform 102 may further include an action translator 306. The action translator 306 may generate the action feedback in response to one or more predicted events. For example, the action translator 306 may access action mappings. As discussed in reference to FIG. 2, the action mappings may map one or more event prediction to one or more action message. Accordingly, the action translator 306 may identify the action messages associated with a predicted event or combination of predicted events. The action translator 306 may combine the action messages into the action feedback. In some examples, the action messages may be combined with other one or more instructions that are native to the computer-augmented environment 106 and cause the computer-augmented environment 106 to communication information to a user of the computer-augmented environment 106. For example, the action feedback may include an instruction that causes the computer-augmented environment 106 (or any component thereof) to display information on a video device, playback audio through a playback device, engage actuators, such as a haptic actuator, or perform any other action that causes the user to receive sensory information.

Depending on the implementation, only certain sensor data, derived events, event predictions and/or action feedback may be relevant to an instance of a real-time platform 102. Deriving or predicting events that are not relevant to a particular computer-augmented environment may decrease performance and/or other otherwise inefficiently allocate computing resources. Accordingly, the real-time platform 102 may be tailored to optimize the real-time responsiveness for particular computer-augmented environments. For example, the real-time platform 102 may be deployed or dynamically configured with a feature model, a prediction model, filter criteria, and/or action mappings.

The real-time platform 102 may include a filter controller 308. The filter controller 308 may control the flow of information through the various stages of the real-time platform 102. The filter controller 308 may be responsive to information provided by the filter criteria. For example, the filter criteria may cause only certain sensor data to reach the real time feature generator 302. For example, the filter criteria may identify one or more types of sensor information, one or more communication channel, and/or one more sensor device of the computer-augmented environment 106. The filter controller 308 may cause, based on the filter criteria, the feature generator 302 to receive data only from the identified communication channel or sensor device. Alternatively or in addition, the filter controller 308 may cause the feature generator 302 to receive the identified type of sensor data.

In some examples, the filter controller 308 may cause the feature generator 302 to derive only certain events. For example, the filter criteria may identify the events to derive with the feature model. The feature generator 302 may derive only the events identified by the filter criteria and not derive other events. Alternatively or in addition, the feature controller 206 may cause the feature generator 302 to receive only the sensor data that can be used to derive features with a high confidence level.

In some examples, the filter controller 308 may cause the event predictor 304 to predict only certain events. For example, the filter criteria may identify events to predict with the prediction model. The event predictor 304 may predict only the events identified in the filter criteria. Alternatively or in addition, the filter criteria may include identifiers of predictive mappings. The event predictor 304 may select prediction mappings associated with the identifiers. The event predictor 304 may perform event predictions only with the selected prediction mappings.

In other examples, the filter controller 308 may compare the confidence values with the output of the prediction model based on one or more confidence thresholds. For example, the filter criteria may include one or more confidence threshold. The filter controller 308 may cause the event predictor 304 to ignore predictive mappings associated with a confidence score less than the confidence threshold.

Figure 4:
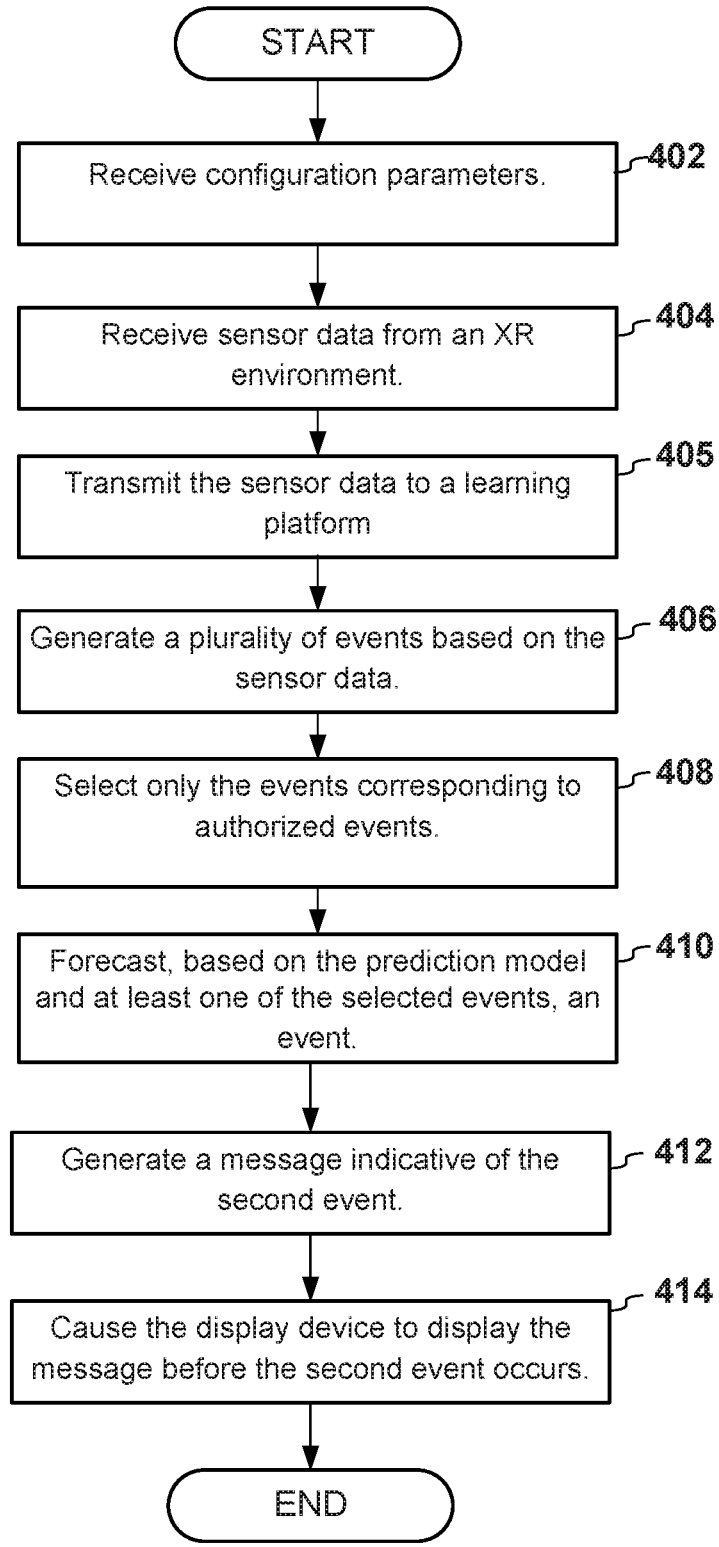
FIG. 4 illustrates an example of a flow diagram for logic of a real-time platform.

FIG. 4 illustrates an example of a flow diagram for logic of the real-time platform 102. The real-time platform 102 may receive configuration parameters (402). The configuration parameters may include configuration settings and/or logic for the real-time platform 102. For example, the configuration parameters may include the feature model, the prediction model, the filter criteria, the action mappings, and/or any other component of the real-time platform 102. The filter criteria may include authorized event identifiers. The authorized event identifiers correspond to events that can be permissibly processed by the real-time platform.

The real-time platform 102 may receive sensor data from the computer-augmented environment 106 (404). The real-time platform 102 may transmit the sensor data to the learning platform (405).

The sensor data may be originated or derived from sensors included in the computer-augmented environment 106. The real-time learning platform 102 may forward the sensor data to the learning platform 104 to improve the feature model, the prediction model, and/or the filter criteria. The real-time platform may continue processing the sensor data while the learning platform 104 updates the models. The real-time platform 102 may receive updated configuration parameters. The updated configuration parameters may include an updated filter criteria, an updated prediction model, and/or a updated feature model. The real-time platform 102 may replace one or more of the previously configured models with one or more updated models. Alternatively or in addition, the real-time platform 102 may replace the previously configured filter criteria with the updated filter criteria.

The real-time platform 102 may generate a plurality of events based on the sensor data (406). The real-time platform 102 may provide the sensor data as inputs to a feature model. The feature model may identify one or more events based on the sensor data. In some examples, the event(s) may be indicative of movement in the physical space. The feature model may be previously trained based on mappings between sensor data and predetermined events.

In some examples, the sensor data may include measurements originated by or derived from a plurality of sensors. The sensor measurements may include, for example, spatial coordinates of respective physical objects. The physical objects may be visible in the field of view of a user of the computer-augmented environment 106. Alternatively or in addition, the physical objects may be detected by a sensor (such as a video camera) of the computer-augmented environment 106. The real-time platform 102 may compare the spatial coordinates of the respective physical objects to determine that the physical objects are moving. For example, the real-time platform 102 may determine that a first object (such as a hand) is moving closer to a second object.

In some examples, the real-time platform may determine, based on the feature model and the sensor data, a pattern of location information corresponding to physical objects. The patterns may be associated with events. Thus identification of one or more patterns may cause the real-time platform to generate the event associated with the pattern.

The real-time platform 102 may select the events corresponding to authorized events. For example, the filter criteria may include authorized event identifiers. The authorized event identifiers may correspond to events that are authorized for processing with the prediction model. The real-time platform may permit events identified by the authorized event identifiers to be provided as inputs to the event predictor 304 and/or the action translator 306. Alternatively or in addition, the real-time platform may restrict events not identified by the authorized event identifiers from being provided to the event predictor 304 and/or the action translator 306.

The real-time platform 102 may forecast, based on the prediction model and at least one of the selected events, an event (410). For example, the real-time platform may access provide, as inputs to a machine learning framework, the prediction model and/or the selected event(s). Alternatively or in addition, the real-time platform may perform may derive a confidence metric and/or an event prediction based on the prediction model and the selected event(s).

The real-time platform 102 may generate a message indicative of the forecasted event (412). For example, the real-time platform 102 may determine the forecasted event is mapped to a message based on action mappings provided to the real-time platform 102. The action mappings may include one or more associations between events and actions messages, such as the action messages previously discussed in reference to FIG. 2. The real-time platform 102 may select, in response to determination that the forecasted event is mapped to the message, one or more action mapping. The real-time platform 102 may extract, from the action mapping, one or more message.

The real-time platform 102 may cause the display device to display the message before the forecasted event occurs (414). For example, the real-time platform 102 may generate action feedback (see FIG. 2). The action feedback may include displayable content that can be displayed via the display device.

Figure 5:
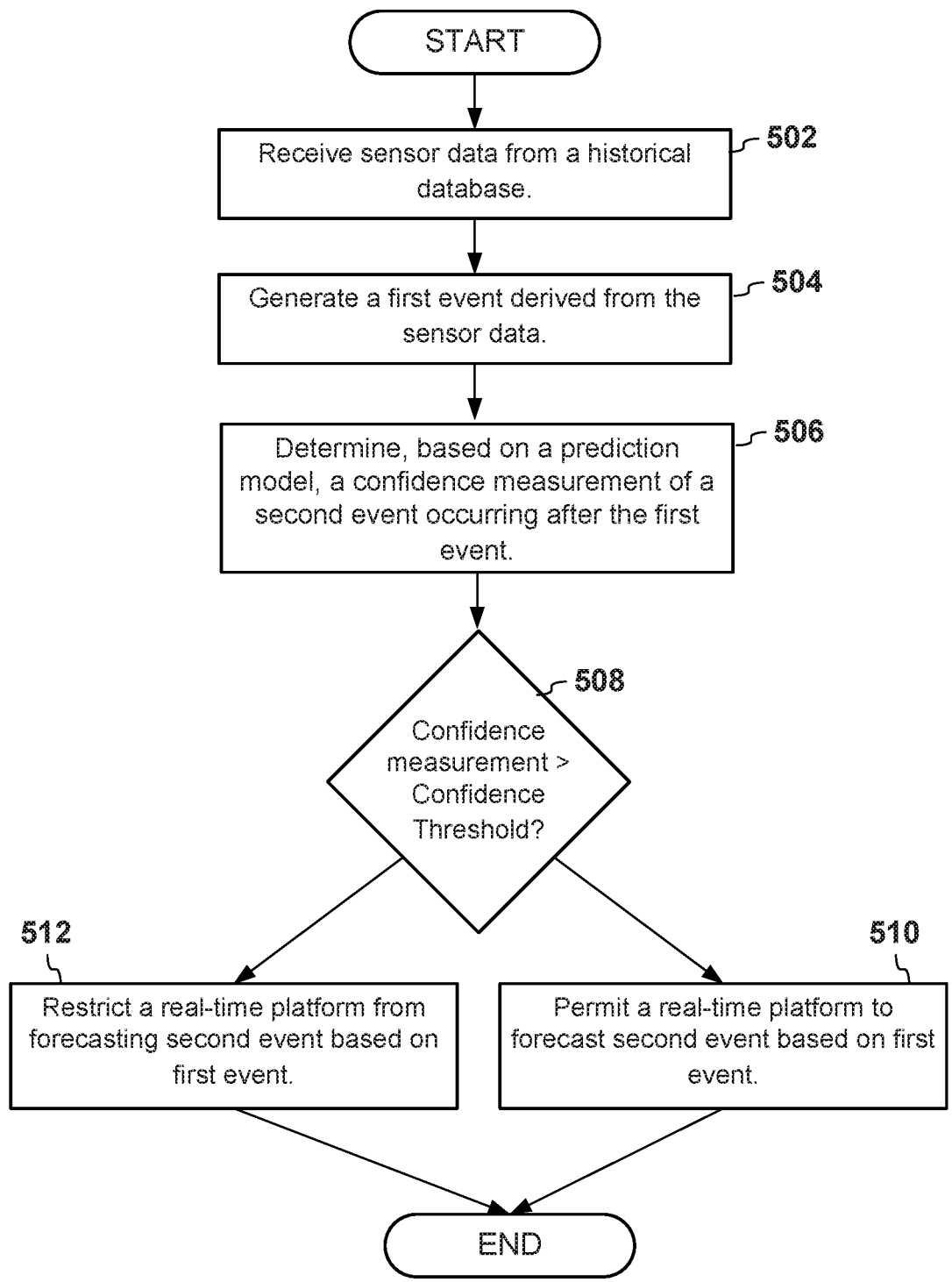
FIG. 5 illustrates an example of a flow diagram for logic of a learning platform.

FIG. 5 illustrates an example of a flow diagram for logic of the learning platform 104. The learning platform 104 may receive sensor data from the historical database 202 (502). In some examples, the learning platform may receive the sensor data from a one or more real-time platforms. Alternatively or in addition, the learning platform may receive the sensor data directly from the computer-augmented environment 106.

The learning platform 104 may generate a first event from the sensor data (504). For example, the learning platform 104 may access a training set and compile a feature model based on the training set. The learning platform 104 may apply the sensor data to the feature model to derive the first event. In some examples, the learning platform 104 may train the feature model based on the sensor data. For example, the learning platform 104 may generate mappings between the sensor data and one or more event identifier(s). The learning platform 104 may submit the training data to an artificial intelligence or machine-learning framework to compile the training date into the feature model.

The learning platform 104 may transmit the feature model to the real-time platform 102. The feature model, or associated confirmation parameters, may cause the real-time platform 102 to detect, in real time, the first event based on the sensor data and the feature model.

The learning platform 104 may determine based on a prediction model, a confidence measurement of a second event occurring after the first event (506). For example, the learning platform 104 may perform analysis of the first event (or events) and with the prediction model. In some examples, the learning platform 104 may submit the prediction model and the event data to a machine learning framework. Alternatively or in addition, the prediction model may include predictive mappings associated with respective confidence measurements, as previously discussed. The learning platform 104 may identify one or more predictive mappings associated with the first event. Extract the second event (or events) from the predictive mappings.

In some examples, the learning platform 104 may generate the prediction model. The learning platform 104 may store the prediction model in the configuration database 204 and/or configure the predication model on the real-time platform 102. For example, the learning platform 104 may determine a separation time and measure a confidence of events having occurred before the separation and after the separation. The investigation analytics may expand into multiple events, and the likelihood of their sequential occurrence. Alternatively or in addition, the system 100 may produce confidence measurements of events of any type appearing sequentially based on multiple users. Likelihood of events may include a statistical metric, such as correlation.

The learning platform 104 may determine whether the confidence measurement is greater than a confidence threshold (508). In some examples, the learning platform 104 may receive the confidence threshold from a user interface. For example, the learning platform 104 may generate a user interface that enables an administrator to configure instances of real-time platforms. The user interface may receive one or more confidence threshold. The confidence threshold may be modified to increase or decrease the accuracy, speed, quantity of predictions provided by the real-time platform 102. The learning platform 104 may generate updated filter criteria in response to receiving updated confidence threshold, and transmit the filter criteria to the real-time platform 102.

In response to the confidence measurement being greater than the confidence threshold, the learning platform 104 may permit the real-time platform 102 to forecast the second event based on the first event (510). In response to the confidence measurement not being rather than the confidence threshold, the learning platform 104 may restrict the real-time platform 102 from forecasting the second event best on the first event (512).

Figure 6:
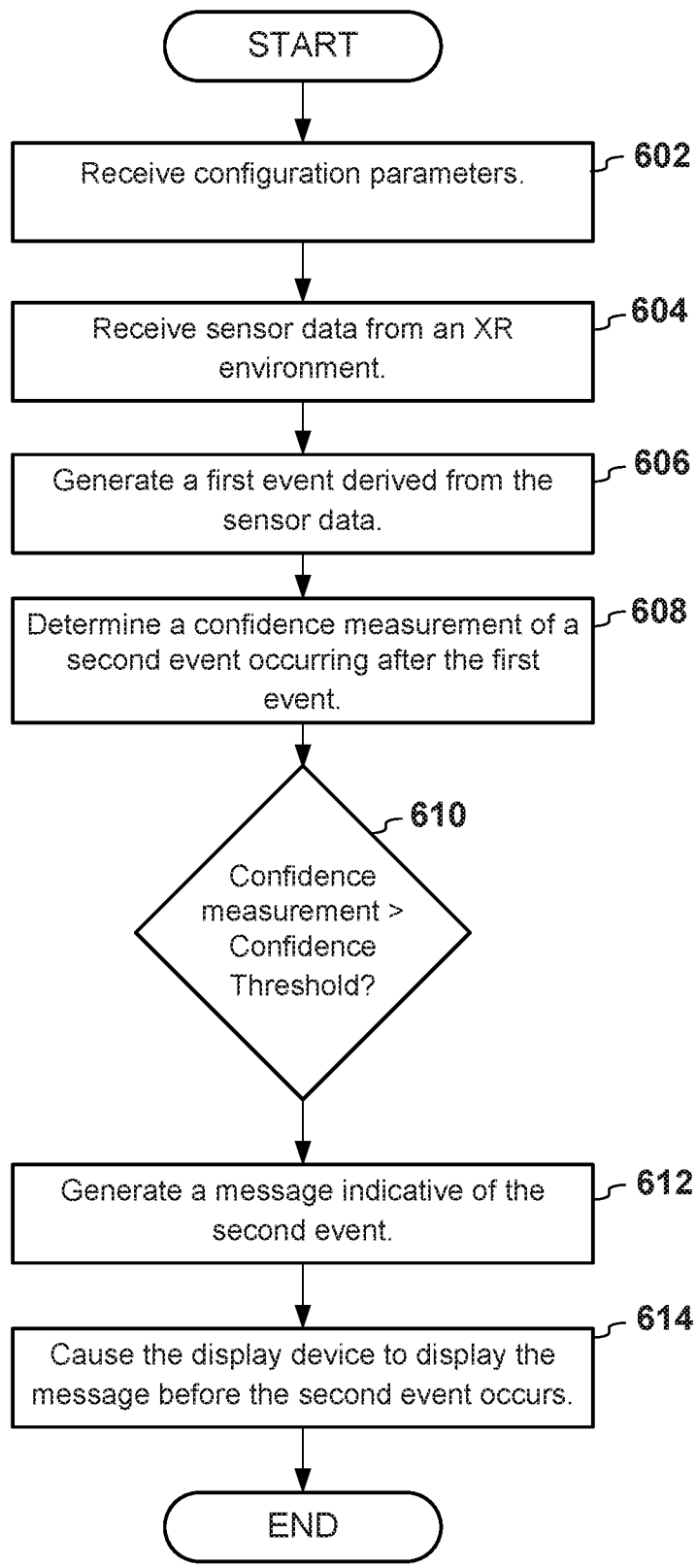
FIG. 6 illustrates a second example of logic for a real-time platform.

For example, the learning platform 104 may generate a filter criteria that authorizes or restricts a real-time platform 102 to forecast the second event with the prediction model and communicate messages to the computer-augmented environment 106 based on the second event. For example, the turning criteria may include a rule or instruction that authorizes or restricts a real-time platform 102 to forecast the second event with the prediction model and communicate messages to the computer-augmented environment 106 based on the second event. Alternatively or in addition, the filter criteria may include a plurality of authorized or restricted mapping identifiers associated with prediction model. The real-time platform 102 may only generate event predictions based on authorized mapping and not restricted mappings FIG. 6 illustrates a second example of logic for the real-time platform 102. The real-time platform 102 may receive configuration parameters (602). The configuration parameters may include configuration settings and/or logic for the real-time platform 102. For example, the configuration parameters may include the feature model, the prediction model, the filter criteria, the action mappings, and/or any other component of the real-time platform 102.

The real-time platform 102 may receive sensor data from the computer-augmented environment 106 (604). The real-time platform 102 may generate a first event derived from the sensor data (606). The sensor data may be originated or derived from sensors included in the computer-augmented environment 106. The real-time platform 102 may provide the sensor data as inputs to a feature model. The feature model may identify one or more events based on the sensor data. In some examples, the event(s) may be indicative of movement in the physical space. The feature model may be previously trained based on mappings between sensor data and predetermined events.

In some examples, the sensor data may include measurements originated by or derived from a plurality of sensors. The sensor measurements may include, for example, spatial coordinates of respective physical objects. The physical objects may be visible in the field of view of a user of the computer-augmented environment 106. Alternatively or in addition, the physical objects may be detected by a sensor (such as a video camera) of the computer-augmented environment 106. The real-time platform 102 may compare the spatial coordinates of the respective physical objects to determine that the physical objects are moving. For example, the real-time platform 102 may determine that a first object (such as a hand) is moving closer to a second object.

The real-time platform 102 may determine a confidence measurement of a second event occurring after the first event (608). For example, the real-time platform 102 may analyze one or more derived event with the prediction model. In some examples, the prediction model may include event mappings. For example, an event mapping may include an association between a first event identifier and second event identifier. The event mapping may include a confidence that the second events occurs after the first event. The real-time platform 102 may select the mappings associated with derived event (or events).

The real-time platform 102 may determine whether the confidence measurement is greater than a confidence threshold. In response to the confidence measurement not being greater than the confidence threshold (610, No), the real-time platform 102 may ignore the event. In response to the confidence measurement being greater than the confidence threshold (610, Yes) the real-time platform 102 may continuing processing the event.

By comparing the confidence measurement of a predicted event with a confidence threshold, the real-time platform 102 may selectively choose which event predictions to take action on and which event predictions to ignore. In some examples, the prediction model may include predictive mappings (such as the correlation matrix shown in Table 1 above). Each of the prediction mappings may be include a corresponding measurement. Accordingly, the real-time platform 102 may ignore the prediction mappings that are associated with corresponding confidence measurements less than the confidence threshold. Alternatively or in addition, the real-time platform 102 may acquire sensor data and/or derived events only for the prediction mappings that have a corresponding confidence higher than the prediction threshold. Thus, the real-time platform 102 may selectively choose which sensor data to acquire and which events to derive, and conserve processing power and memory by not receiving irrelevant sensor data, deriving irrelevant events, or predicting irrelevant events.

The real-time platform 102 may generate a message indicative of the second event (612). For example, the real-time platform 102 may determine the second event is mapped to a message based on action mappings provided to the real-time platform 102. The action mappings may include one or more associations between events and actions messages, such as the action messages previously discussed in reference to FIG. 2. The real-time platform 102 may select, in response to determination that the second event is mapped to the message, one or more action mapping. The real-time platform 102 may extract, from the action mapping, one or more message.

The real-time platform 102 may cause the display device to display the message before the second event occurs (614). For example, the real-time platform 102 may generate action feedback (see FIG. 2). The action feedback may include displayable content that can be displayed via the display device.

The logic illustrated in the flow diagrams may include additional, different, or fewer operations than illustrated. The operations illustrated may be performed in an order different than illustrated.

The system 100 may be implemented with additional, different, or fewer components than illustrated. For example, the system may include the learning platform 104 and/or the real-time platform 204 with or without the computer-augmented environment. Alternatively or in addition, the computer-augmented environment many include the learning platform 104 and/or the real-time platform. Each component may include additional, different, or fewer components.

Figure 7:
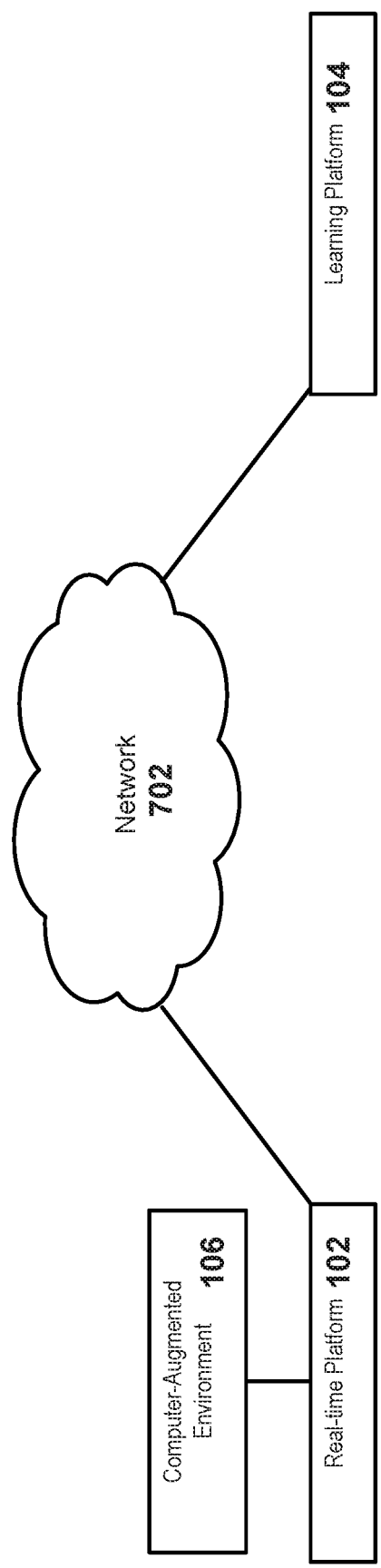
FIG. 7 illustrates a second example of a real-time feedback system.

FIG. 7 illustrates a second example of the system 100. The real-time platform 102 may communicate with the learning platform 104 by way of network 702. The network may include any physical or virtual system where information is exchanged between data links. For example, the network may include a computer network, such as an IP-based network where multiple interconnected nodes relay information according to a network protocol. The network may be a local network where physical devices are located in proximity to each other or a wide area network, such as the internet.

In some examples, the real-time platform 102 may be physically remote from the learning platform 104, and separated by network 702. For example, the learning platform 104 may be configured on a server or cloud based system while the real-time platform 102 is located proximate to the computer-augmented environment 106. Alternatively or in addition, the real-time platform 102 may be share the same hardware resources as computer-augmented environment, or a portion thereof. In other examples, the real-time platform 102 may communicate with the computer-augmented environment by way of a local network, or some other network that is not connected with the learning platform 104. Keeping the real-time platform 102 proximate to the computer-augmented environment 106 may facilitate faster performance in terms of latency, bandwidth, and other performance considerations. In other examples, the real-time platform 102 may communicate, the self-learning platform 104, and/or the computer-augmented environment may each communicate via the network 702.

Figure 8:
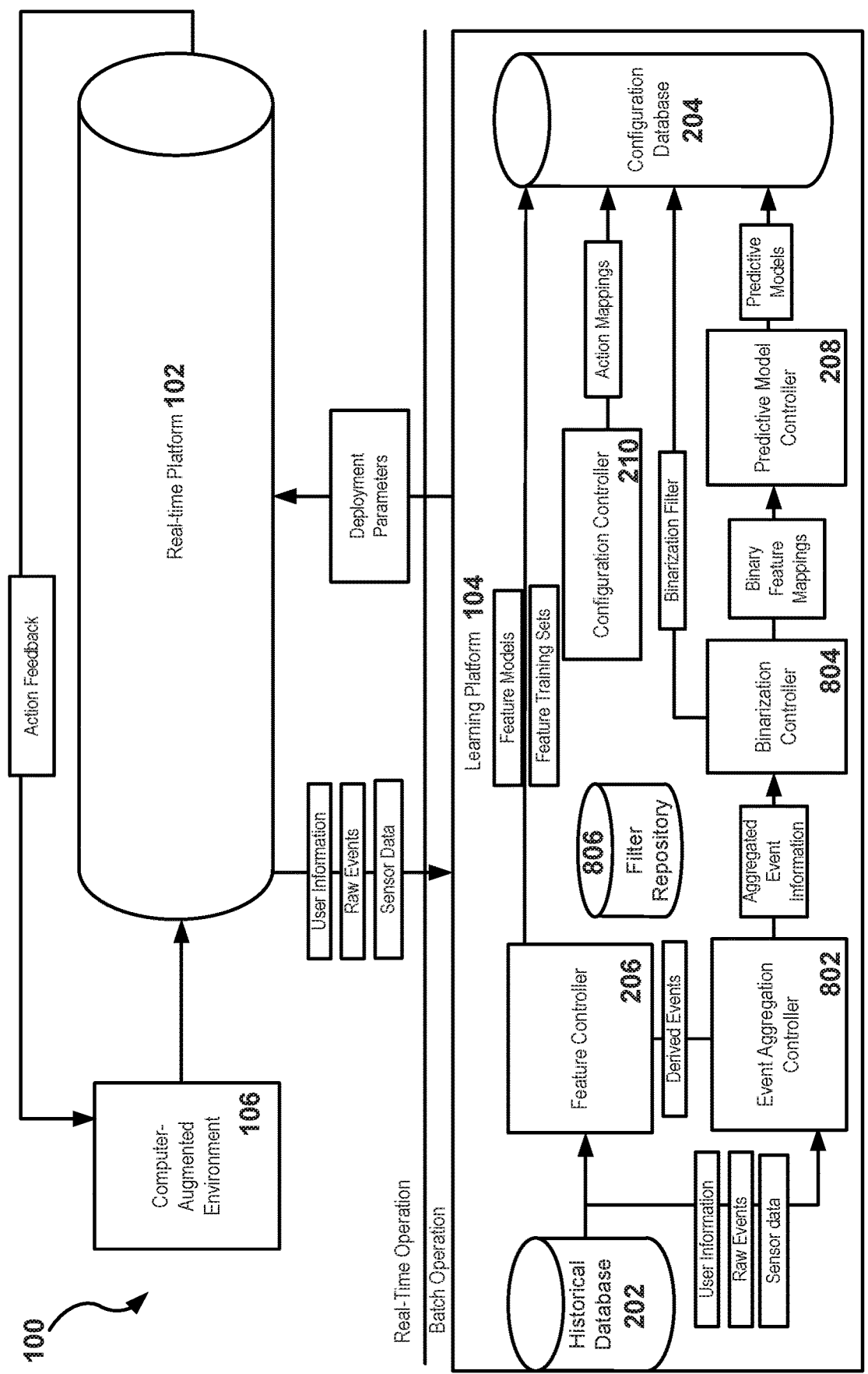
FIG. 8 illustrates a second example of a learning platform.
Figure 9:
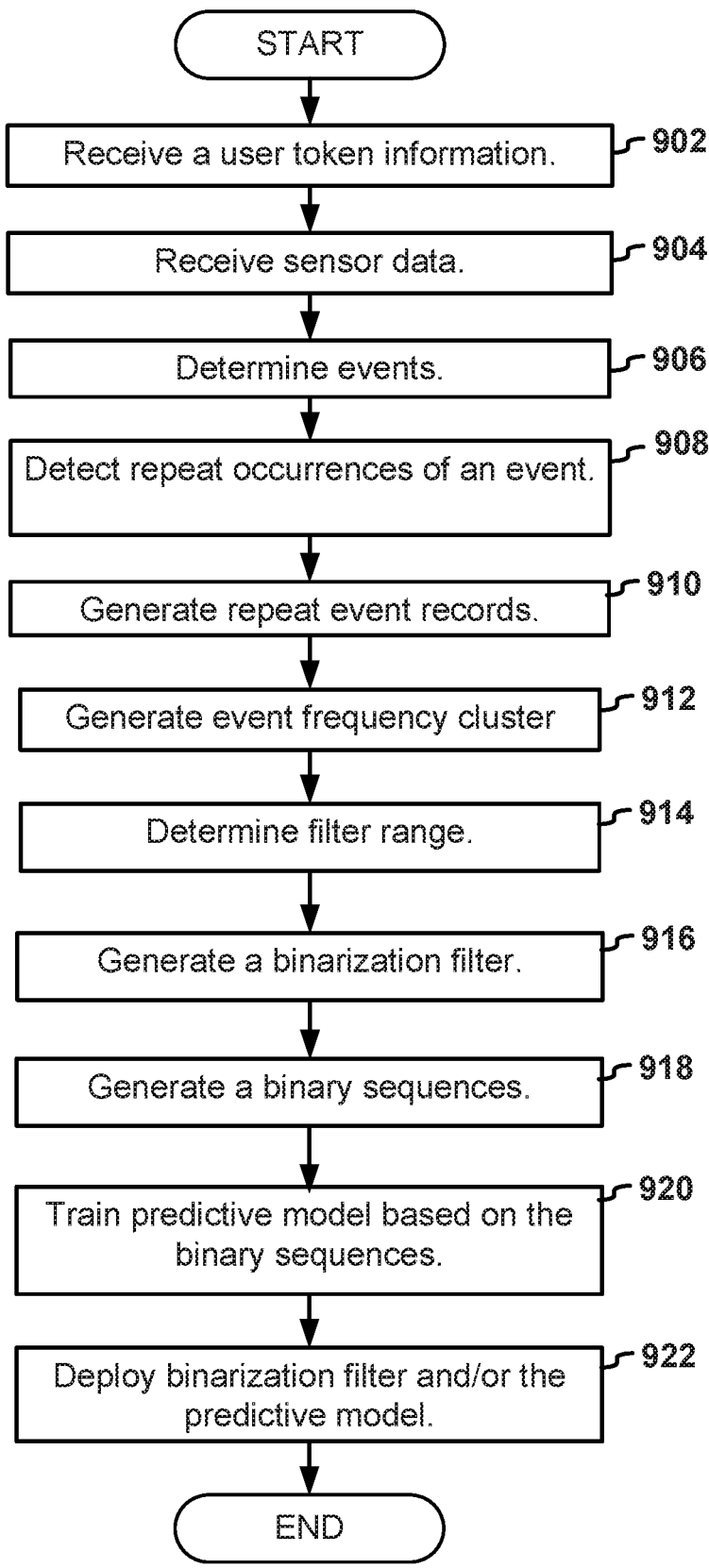
FIG. 9 illustrates a second example of logic for a learning platform.

FIG. 8 illustrates a second example of the learning platform 104. FIG. 9 illustrates a second example of logic for the learning platform 104. Reference to FIG. FIG. 9 is made through the following discussion regarding FIG. 8.

The learning platform 104 may include an event aggregation controller 802. The event aggregation controller 802 may receive user token information (902). The user token information may include, for example, one or more user token. A user token may include an identifier value, such as a unique identifier, of a user and/or a user profile account. In some examples, the user token may be assigned by the computer-augmented environment 106. Alternatively, the learning platform 104, the real-time platform 102, or an authentication service may allocate a user token for users.

The learning platform 104 may receive sensor data (904). The sensor data may be associated with user token information. For example, the computer-augmented environment 106 may associate the sensor data with a user token when the sensor data is generated based on interactions of a user corresponding to the user token. Alternatively or in addition, the real-time platform 102 and/or the learning platform 104 may establish a session with the computer-augmented environment 106. A session may refer to a period of communication with the computer-augmented environment 106. In some examples, the session may be authenticated based on the user token or credentials associated with the user token. The real-time platform 102 and/or the learning platform 104 may associate sensor data, raw events, and/or derived events with the user token. In an example, the real-time platform 102 may receive sensor data from the computer-augmented environment 106 during a session authenticated based on a user token of a user interacting with the computer-augmented environment 106. The real-time platform 102 may associate the user token with the sensor data and then sends the user token and sensor data to the learning platform 104.

The learning platform 104 may determine one or more events (906). For example, the feature controller 206 may determine one or more derived events based on raw events and/or sensor information received from the computer-augmented environment 106, the real-time platform 102, and/or the historical database 202, as discussed in reference to FIGS. 2, 4, and 5.

The learning platform 104 may include an event aggregation controller 802. The event aggregation controller 802 may receive event information. The event information may include the raw events, the sensor data, and/or the derived events. Alternatively or in addition, the event aggregation controller 802 may receive user token information associated with the event information. In some examples, the historical database 202 may store the event information. The event aggregation controller 802 may receive the event information and/or the user token information from the historical database.

The event aggregation controller 802 may detect repeat occurrences of an event (908). For example, the event aggregation controller 802 may search the historical database for events that occur within a predefined time window. Alternatively or in addition, the event aggregation controller 802 may determine an initial event at a first time and then select events that occur within a predefined time period after the first event.

In some examples, an event may be associated with an event type. An event type may include a category or classification of an event. For example, an event include an instance, or occurrence, of an event type at a particular moment in time or over an interval of time. The event may be associated with the event type and assigned to a particular user identifier (or user identifiers). By way of example, an event type may be identified as <drop_screw> and represent the act of dropping a screw. A user identified as "USER 123" may perform actions that generate sensor data that is sent to the real-time platform 102. The learning platform 104 and/or the real-time platform 104 may interpret the sensor data and then generate an event representative of the user dropping the screw at a particular type. For example, the event may be expressed as <Event Type=drop_screw, User Identifier=USER 123, Time=1558711382>.

In response to detecting a repeat occurrence of an event, the event aggregation controller 802 may generate a repeat event record (910). The repeat event record may include an association between an event type, a user identifier, and an occurrence frequency. The occurrence frequency may include the quantity of times the event occurred. For example, if a user identified as 111111 dropped a screw three times, the occurrence frequency for the repeat event record would be three.

The event aggregation controller 802 may store repeat event records in the historical database 202, or some other data storage. For example, the repeat event records may be stored in a table format, such as the format shown Table 3. In other examples, the repeat event records may include, or be stored in, relational, non-relational, document based, or other data structures that establish an association between at least an event type and a number of occurrences.

TABLE 3

| Repeat Event Record | | |
|---|---|---|
| User Token | Event Type Identifier | Occurrence count |
| 111111 | drop_screw | 3 |
| 111111 | picking_up_screw | 2 |
| 222222 | drop_screw | 3 |
| 333333 | drop_screw | 1 |
| . . . | . . . | . . . |

The event aggregation controller 802 may cluster the event frequency records (912). For example, the event aggregation controller 802 may generate one or more repeat event cluster. A repeat event cluster may a grouping of repeat event records selected based on a measured similarity between occurrence frequency and/or user frequency. The event aggregation controller 802 may perform clustering on the sensor data, events, repeat event records, or other derived data, to generate the repeat event cluster(s).

By way of example, the event aggregation controller 802 may generate an event frequency mapping. An event frequency mapping may include a mapping between an occurrence frequency and a user frequency. The user frequency may represent a number of users that repeatedly performed the event the same number of times. For example, the user frequency may represent a quantity of user tokens that are selected from the repeat event records in response to the user tokens being associated with a matching occurrence frequency. The occurrence frequency may represent the quantity of times that an event occurs. The rows in Table 4 provide additional or alternative examples of event frequency mappings.

TABLE 4

| Event Frequency Mappings | | | |
|---|---|---|---|
| Event Frequency Mapping Identifier | Occurrence Frequency | User Frequency | Event Type Identifier |
| map_a | 3 | 3 | drop_screw |
| map_b | 1 | 1 | drop_screw |
| map_c | 2 | 1 | pick_up_screw |
| . . . | . . . | . . . | . . . |

Figure 12:
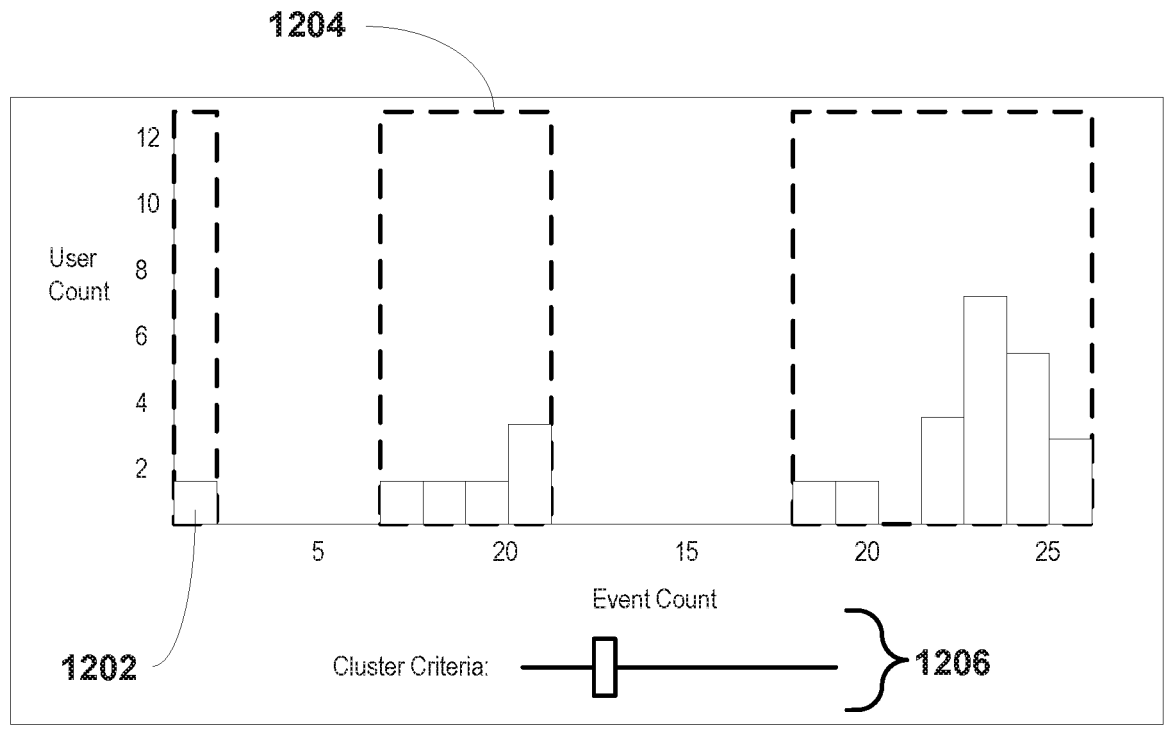
FIG. 12 illustrates a first example of a graphical user interface.
Figure 13:
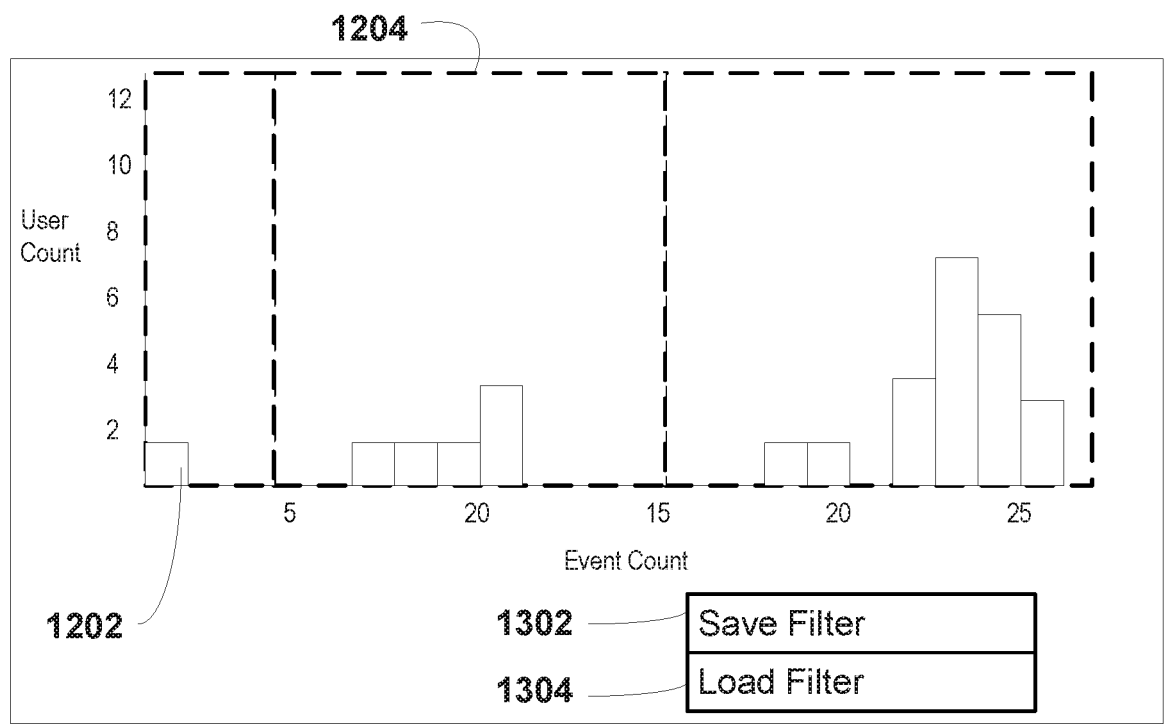
FIG. 13 illustrates a second example of a graphical user interface.

In some examples, an event frequency mapping may be displayed graphically, as shown in FIG. 12 and FIG. 13.

In various implementations, to generate the event frequency mapping, the event aggregation controller 802 may select repeat event records associated with the same event type and/or occurrence frequency. Each of the selected repeat event records may be associated with a different corresponding user token. The event aggregation controller 802 may generate an event frequency mapping for the selected repeat event records where the occurrence frequency is the occurrence frequency that is shared between the selected repeat event records, and where the user frequency is the quantity of the selected repeat event mappings.

The event aggregation controller 802 may identify groups of event frequency mappings (or repeat event records) based on a clustering framework. The clustering framework may include a machine-learning framework that applies analytical operations, statistical operations, and/or machine learning operations to group data into separate groups. For example, the clustering framework may select event frequency mappings where combinations of one or more occurrence frequency and user frequencies are identified based on clustering analysis and data mining. In some examples, the clustering framework may apply unsupervised machine learning. Alternatively or in addition, the clustering framework may apply K-means, DBSCAN, Expectation-Maximization, Hierarchical Clustering, and/or other clustering applicable to dimensional data.

The learning platform 104 may include a binarization controller 804. The binarization controller 804. May receive aggregated event information. The aggregated event information may include one or more event frequency mappings and/or one or more event frequency clusters for an event. In some examples, the aggregated event information may be stored in the historical database and associated with relevant event types.

The binarization controller 804 may determine a filter range (914). The filter range may include a numerical range that includes the number of occurrences for at least one of the event frequency clusters. For example, the filter range may include a lower boundary and/or an upper boundary. In some examples, the lower boundary may be less than or equal to the lowest event count in an event frequency cluster and the upper boundary may be greater than or equal to the greatest event count in an event frequency cluster. Alternatively or in addition, the event filter may have an upper boundary without a lower bounder or a lower boundary without an upper boundary. In some examples, the lower boundary and/or the upper boundary may be a value representative of infinity or zero.

One or more boundary of a filter range may be adjusted to so that the numerical ranges of multiple filter ranges cover a continuous numerical range of occurrence frequencies. For example, a first filter range may be adjusted so that the upper boundary of the first filter range corresponds to a lower boundary of a second filter range. Alternatively or in addition, the and upper or lower boundary may be assigned 0 or infinity at the extrema in a domain of event counts. Table 4 includes examples of filter ranges before and after adjustment.

TABLE 4

| Filter Ranges | | | |
|---|---|---|---|
| | Filter Range 1 | Filter Range 2 | Filter Range 3 |
| Before Boundary Adjustment | [1-4] | [7-10] | [14] |
| After Boundary Adjustment | [0-5] | [6-12] | [13-∞] |

The binarization controller 804 may generate a binarization filter (916). The binarization filter may include logic to determine whether an input event count is within one or more filter range. The binarization filter may be logic to compare the input event count with the filter range(s) For example, the binarization filter may generate a binary value that indicates whether an input event count is within a filter range.

In some examples, the binarization filter may include logic to generate a binary sequence. A binary sequence may include a plurality of binary values. Each of the binary values may be associated with (or representative of) a corresponding filter range. The binarization filter may include logic to determine the binary values of a binary sequence based comparison of an input event count with at least one of the filter ranges. By way of example, the binarization filter may include the logic of Table X for the adjusted filter ranges in table 5:

TABLE 5

If (0 ≤ n ≤ 5){return 100}
If(6 ≤ n ≤ 12){return 010}
If(13 < n < ∞){return 001}

As shown in Table 5, binary sequences are exemplified as 100, 010, 001. In generally, the binary sequence may include any data set where one or more binary values are representative of a corresponding filter range. In some examples, the binarization sequence may be one-hot encoded. For example, the binarization filter may generate a binary sequence where one binary value is indicative of an input event count being included in a filter range, and the remaining binary values are indicative of the input event not being included in other filter ranges.

The binarization controller 804 may generate binary sequences for multiple users (918). For example, the binarization controller 804 may generate a binary sequence based on repeated events detected for a user. The binarization controller 804 may determine one or more repeat event record in response to a user performing a repeat action. The binarization controller 804 may apply the event count of the repeat event record to the binarization filter. For example, the binarization controller 804 may execute the logic of the binarization filter. Alternatively or in addition, the binarization controller 804 may execute logic, which accesses the binarization filter. As multiple users generate repeat event counts, the binarization controller 804 may refine and update one or more binarization filter.

In some examples, learning platform 104 may store one or more binarization filter in the configuration database 204. The configuration database 204 may include the binarization filter and/or associations between the binarization filters and other information, such as event types. During training, the binarization controller 804 may select the binarization filter for an event from a configuration database 204. For example, the binarization controller 804 may determine that an event type of a repeat event record is associated with a binarization filter. The binarization controller 804 may access the configuration database 204. The binarization controller 804 may select at least one of the binarization filters in response to the at least one of the binarization filters being associated with an event type.

The prediction model controller may train a prediction model based on binary sequences (920). The binary sequences may provide binary features for a machine learning model. For example, the predictive model controller 208 may generate a prediction model based on the binary values included in the binarization sequences. The prediction model may include a trained association between a binary sequence and a subsequent event. In other words, the prediction model may include a trained association between a range of repeat event counts and a subsequent event. For example, the prediction model may include an association rules model. Association Rules may provide a transparent model and/or explainable, i.e. it is human-readable, allowing an insight into 'how' the model has reached its conclusion. In other examples, the prediction model may include Random Forest, Logistic Regression, Neural Networks, and/or others.

The configuration controller may deploy the binarization filter and/or the prediction model (922). For example, the prediction model may generate deployment parameters. The deployment parameters may include a binarization filter and/or a prediction model. During deployment or configuration of the real-time platform 102, the configuration controller may communicate the deployment to the real-time platform 102. In some examples, the learning platform 104 may cause the prediction model and binarization filters to be stored and accessed by the real-time platform 102. The real-time platform 102 may apply the binarization filter to generate user-specific binary sequences in response to user-specific sensor data. User specific sensor data may refer to real-time sensor data generated based the actions of a particular user interacting with the computer-augmented environment. A user-specific binary sequence may include a binary sequence that was generated based on repeated actions of the particular user.

The learning platform 104 may continue to receive sensor data and/or raw event data while the real-time platform 102 is deployed. In response to receiving the sensor data and/or the raw event data, the learning platform 104 may generate updated binarization filter(s) and/or updated prediction models that are more accurate or modified based on user input. The learning platform 104 may re-deploy the updated binarization filter(s) and/or the updated prediction model(s) to the real-time platform 102.

In some examples the binarization controller 804 and/or the prediction model controller 806 may receive a platform identifier. The platform identifier may represent a deployed instance of the real-time platform 102. The configuration database 204 may include one or more mappings between the platform identifier and event types. The event types mapped to the platform identifier may represent the event types that are relevant or supported by a particular instance of the real-time platform 102. The binarization controller generate binary filter(s) that are associated with repeat events of the event types, and one or more prediction models may be trained based on binary sequences provided by the binary filter(s). The resultant binary filter(s) and prediction model(s) may be associated with the platform identifier. Accordingly, the learning platform 104 may generate and store binary filter(s) and prediction model(s) based on the particular sets of event types respectively supported by multiple deployed instances of real-time platforms.

Figure 10:
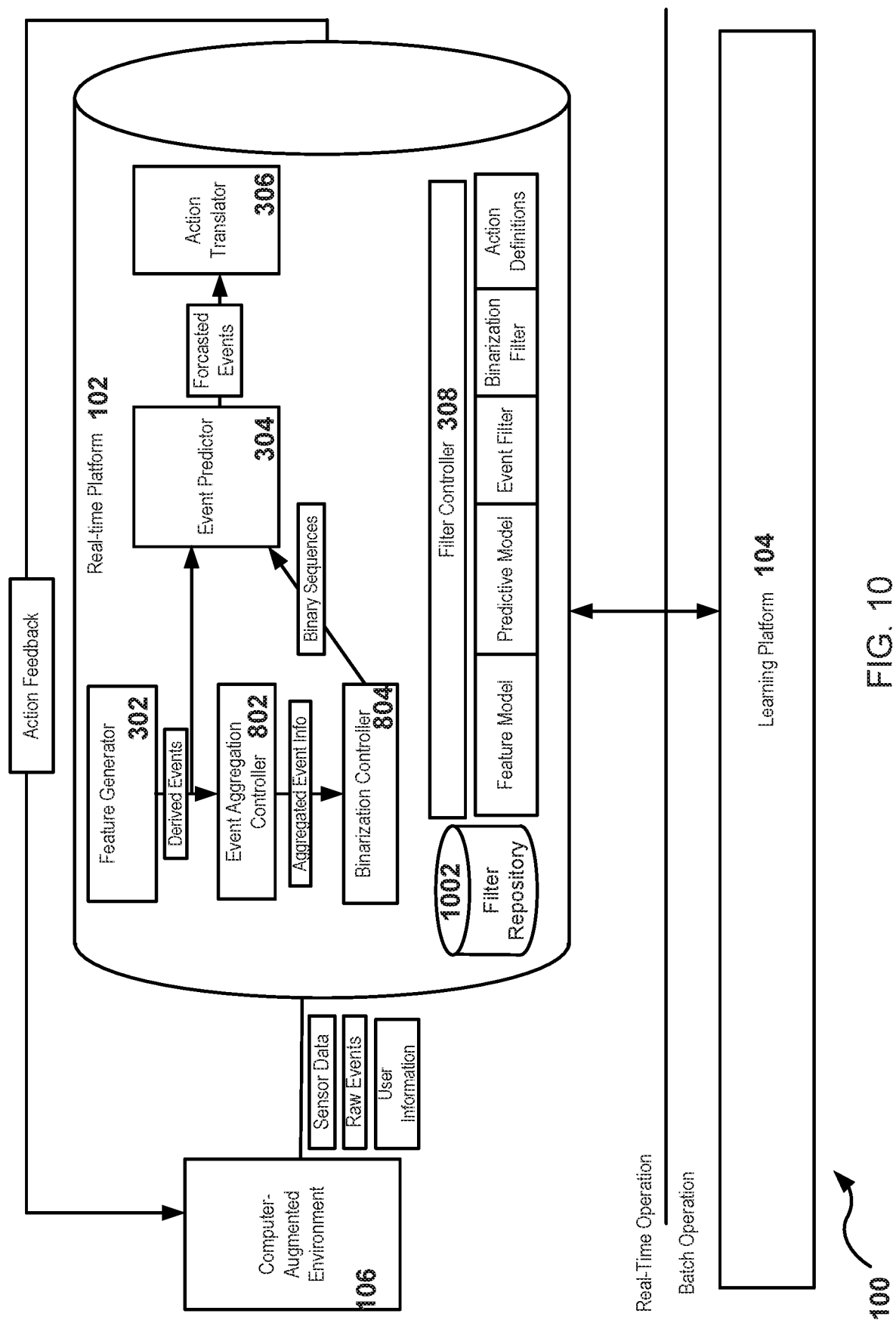
FIG. 10 illustrates a second example of a real-time platform.
Figure 11:
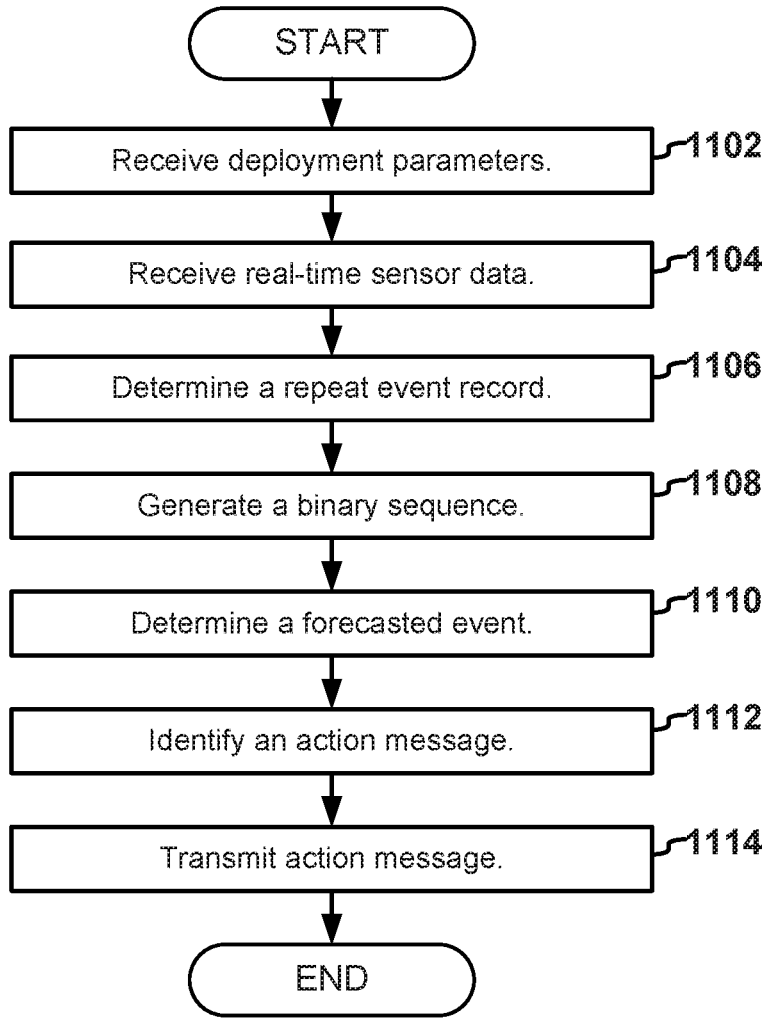
FIG. 11 illustrates a third example for logic of the real-time platform.

FIG. 10 illustrates a second example of the real-time platform 102. FIG. 11 illustrates a third example for logic of the real-time platform 102. Reference to FIG. 11 is made throughout the following discussion of FIG. 10.

The real-time platform 102 may receive deployment parameters (1102). The deployment parameters may be generated and/or communicated by the learning platform 104. The deployment parameters may include one or more binarization filter and/or one or more prediction model. The learning platform 104 may store the binarization filter(s) and the prediction model(s) in a storage, such as a memory or database accessible by the real-time platform 102.

In some examples, the real-time platform 102 may include the filter repository 1002. The filter repository 1002 may include a storage, such as a database and/or set of memory locations. The filter repository 1002 may include a cache of binarization filters that are compatible to the real-time platform 102 and/or the prediction models deployed on the real-time platform 102. In other words, the filter repository 1002 may store the binarization model(s) that generated binary sequences to train the prediction model(s) of the real-time platform 102. The filter repository 1002 may store associations between binarization filters and event types. Accordingly, binarization controller 804 may detect an event type for an event and then identify a binarization filter associated with the event type in the filter repository 1002.

The real-time platform 102 may receive an updated binarization filter. For example, the learning platform 104 may update or improve binarization filter(s) based on event or sensor data received from the real-time platform 102. The real-time platform 102 may replace one or more previous binarization filter with one or more updated binarization filter. In some examples, the real-time time platform may replace perform the replacement in the filter repository 1002. Alternatively or in addition, the real-tie platform 102 may receive an updated filter repository and replace the filter repository 1002 with the updated filter repository.

The real-time platform 102 may receive real-time sensor data (1104). The sensor data may be generated by the computer-augmented environment. In some examples, the sensor data may be associated with a user token for a user interacting with the computer-augmented environment 106. Alternatively or in addition, the real-time platform 102 may establish a communication session that is authenticated based on the user token, or a credential associated with the user token. The real-time platform 102 may associate the sensor data with the user token in response to receipt of the sensor data during the communication session.

The real-time platform 102 may include the event aggregation controller 802. The event aggregation controller 802 may include a version of the event aggregation controller 802 included in the learning platform 104. In some examples, the event aggregation controller 802 may be tailored to process only the sensor data or raw events that are event types, user tokens, or other parameters configured on the real-time platform 102. The event aggregation controller 802 may determine a repeat event record for the real-time platform 102.

In some examples, the event aggregation controller 802 may determine repeat event records in real-time (1106). For example, the event aggregation controller 802 may receive an event (i.e. a raw event or a derived event). The event aggregation controller 802 may determine a first event based on the real-time sensor data. The event aggregation controller 802 may determine the first event is associated with an event type. The event aggregation controller 802 may generate a repeat event record for the event type. The repeat event record may include a repeat event count. The event aggregation controller 802 may determine one or more subsequent events based on the sensor data. The event aggregation controller 802 may determine the subsequent event is associated with the event type. The event aggregation controller 802 may increase the repeat event count of the repeat event record in response to receipt of the subsequent event type and the subsequent event being associated with the event type.

In some examples, the event aggregation controller 802 may stop detecting subsequent events and/or generate the repeat event record after a predetermined time window of detecting the first event. The predetermined time window may be associated with the event type. Accordingly, various event types may have corresponding predetermined time windows in which to monitor for subsequent events. In some examples, the event aggregation controller 802 may cache events and then generate the repeat event count after the predetermined time window has passed.

The real-time platform 102 may include the binarization controller 804. The binarization controller 804 may generate a binary sequence (1108). For example, the binarization controller 804 may generate the binary sequence based on the binarization filter and a repeat event count determined for a series of repeat events. The binary sequence may be indicative of the repeat event count being included in at least one of the filter ranges of binarization model. For example, the binary sequence may include a binary value indicative of at least one of the filter ranges.

In some examples, the binarization controller 804 may generate a first binary value indicative of the event count being included in a first filter range of the binary filter. The binarization controller 804 may generate a second binary value indicative of the event count being included in a second filter range. The binarization controller 804 may generate additional binary values corresponding to additional binary ranges included in the event filter. The real-time platform 102 may combine the first, second, and/or additional binary values into a binary sequence.

The event predictor 304 may determine a forecasted event (1110). For example, the real-time platform 102 may determine the forecasted event based on the prediction model and binary sequence (s). In some examples, the event predictor 304 may submit the binary sequence and the prediction model to a machine-learning framework. The machine-learning framework may determine a forecasted event (or an identifier of the forecasted event). Alternatively or in addition, the machine-learning framework may determine a confidence value indicative of the binary sequence being associated with the forecasted event. The event predictor 304 may accept the forecasted event in response to the confidence metric being greater than confidence threshold. The confidence threshold may be calibrated based on input and/or deployment parameters provided to the real-time platform 102.

The action translator 306 may identify an action message (1112). For example, the action translator 306 may identify an event type identifier associated with the forecasted event. The real-time platform 102 may access an action repository comprising a plurality of action messages mapped to the event type identifiers. The real-time platform 102 may select the action message in response to the event type identifier for the forecasted event being mapped to the action message in the action repository.

The real-time platform 102 may transmit the action message (1114). For example, the real-time platform 102 may transmit the action message to the computer-augmented environment. The real-time platform 102 may cause the computer-augmented environment 106 to display information included in the action message. For example, the action message may include an instruction that causes the real-time platform 102 to communicate information to a user through visual, audible, haptic, and other mediums.

FIG. 12 illustrates a first example of a graphical user interface. The learning platform 104 may generate a histogram that displays an event frequency mapping graphic 1202. The event frequency mapping graphic 1202 may include a graphical representation of an event frequency mapping. For example, the event frequency mapping graphic 1202 may include a graphic that associates a user frequency with an event frequency. The histogram may include multiple event frequency mapping graphics.

The user interface may display a frequency range graphic 1204. The event frequency mapping graphic 1202 may represent an event frequency cluster and/or a filter range. In some examples, the first graphical user interface may enable interaction with the frequency range graphic 1204. For example, the frequency range graphic 1204 may include an interactive control. A user may interact with the frequency range graphic 1204 by resizing the graphic to include or exclude the portion of the event frequency axis. For example, one or more frequency range graphics may be resized to continuously cover the event frequency axes (see FIG. 13).

The user interface may display a cluster criteria control. The cluster criteria control may include a control that receives or generates a clustering parameter (or an adjustment to a clustering parameter). The clustering parameter may include a parameter provided to a clustering framework to perform clustering. For example, the clustering parameter may include a number of clusters (i.e. K in the K-Means clustering). Alternatively or in addition, the clustering parameter may include a silhouette metric. In response to receiving an updated clustering parameter, the learning platform 104 may re-cluster event frequency records and determine new filter ranges based on the re-clustering.

FIG. 13 illustrates a second example of the graphical user interface. The user interface may include a first control 1302 to generate or save a binarization filter. For example, in response to interaction with the first control 1302. The learning platform 104 may generate the binarization filter based on one or more filter ranges corresponding to the filter range graphics.

In some examples, the user interface may include a second control 1304. The second control 1304 may enable a binarization filter to be loaded and the filter ranges of the binarization filer to be displayed. For example, the user interface may display the filter range graphics corresponding to the filter ranges of a binarization filter in response to interaction with the second control 1304.

Figure 14:
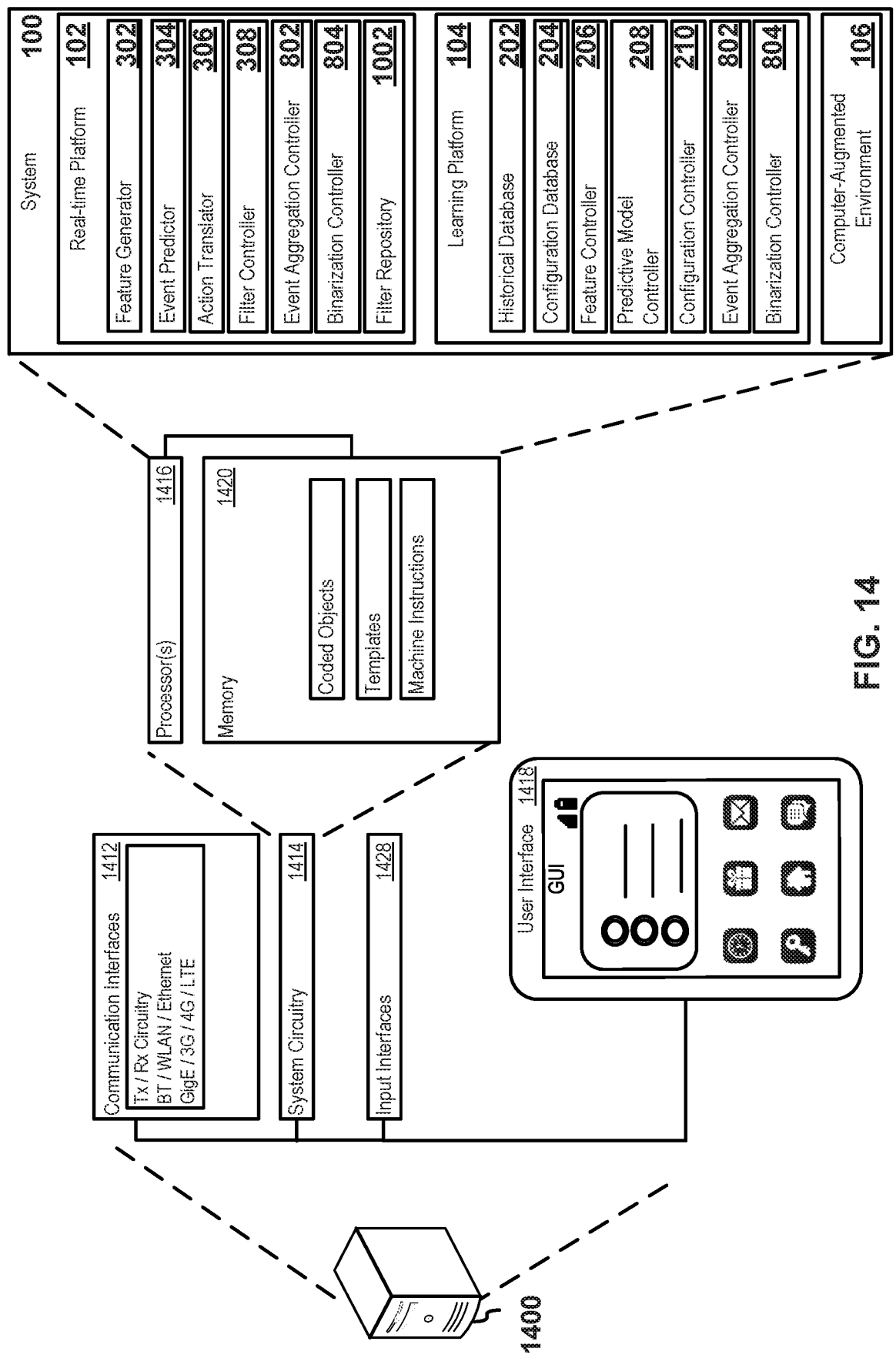
FIG. 14 illustrates an example of a computing environment for a system.

FIG. 14 illustrates an example of a computer environment 1400 for the system 100. The computer environment 1400 may include a hardware platform for the real-time platform 102, the learning platform 104, the computer-augmented environment 106, and/or any subcomponent therein. The computer environment 1400 may include communication interfaces 1412, input interfaces 1428 and/or system circuitry 1414. The system circuitry 1414 may include a processor 1416 or multiple processors. Alternatively or in addition, the system circuitry 1414 may include memory 1420.

The processor 1416 may be in communication with the memory 1420. In some examples, the processor 1416 may also be in communication with additional elements, such as the communication interfaces 1412, the input interfaces 1428, and/or the user interface. Examples of the processor 1416 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 1416 may be one or more devices operable to execute logic. The logic may include computer executable instructions or computer code stored in the memory 1420 or in other memory that when executed by the processor 1416, cause the processor 1416 to perform the features implemented by the logic of the real-time platform 102, the feature generator 302, the event predictor 304, the action translator 306, the filter controller 308, the learning platform 104, the feature controller 206, the predictive model controller 208, the configuration controller 210, the computer-augmented environment 106, the event aggregation controller 802, the binarization controller 804, the filter repository 1002 or any component or subcomponent of the system 100. The computer code may include instructions executable with the processor 1416.

The memory 1420 may be any device for storing and retrieving data or any combination thereof. The memory 1420 may include non-volatile and/or volatile memory, such as a random access memory (RAM), a read-only memory (ROM), an erasable programmable read-only memory (EPROM), or flash memory. Alternatively or in addition, the memory 1420 may include an optical, magnetic (hard-drive), solid-state drive or any other form of data storage device. The memory 1420 may include at least one of the real-time platform 102, the feature generator 302, the event predictor 304, the action translator 306, the filter controller 308, the learning platform 104, the historical database 202, the configuration database 204, the feature controller 206, the predictive model controller 208, the configuration controller 210, the computer-augmented environment 106, the event aggregation controller 802, the binarization controller 804, the filter repository 1002 the system 100, or any component or subcomponent of the system 100. Alternatively or in addition, the memory may include any other component or sub-component of the system 100 described herein.

The user interface 1418 may include any interface for displaying graphical information. The system circuitry 1414 and/or the communications interface(s) 1412 may communicate signals or commands to the user interface 1418 that cause the user interface to display graphical information. Alternatively or in addition, the user interface 1418 may be remote to the system 100 and the system circuitry 1414 and/or communication interface(s) may communicate instructions, such as HTML, to the user interface to cause the user interface to display, compile, and/or render information content. In some examples, the content displayed by the user interface 1418 may be interactive or responsive to user input. For example, the user interface 1418 may communicate signals, messages, and/or information back to the communications interface 1412 or system circuitry 1414.

The system 100 may be implemented in many different ways. In some examples, the system 100 may be implemented with one or more logical components. For example, the logical components of the system 100 may be hardware or a combination of hardware and software. The logical components may include the real-time platform 102, the feature generator 302, the event predictor 304, the action translator 306, the filter controller 308, the learning platform 104, the historical database 202, the configuration database 204, the feature controller 206, the predictive model controller 208, the configuration controller 210, the computer-augmented environment 106, the event aggregation controller 802, the binarization controller 804, the filter repository 1002 the system 100, or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 1420, for example, that comprises instructions executable with the processor 1416 or other processor to implement one or more of the features of the logical components. When any one of the logical components includes the portion of the memory that comprises instructions executable with the processor 1416, the component may or may not include the processor 1416. In some examples, each logical component may just be the portion of the memory 1420 or other physical memory that comprises instructions executable with the processor 1416, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The systems and methods described herein may be related to one or more of the following aspects.

A first aspect may include a system comprising a leaning platform configured to receive events derived from historical sensor data, the events respectively associated with user tokens. In some examples, the historical sensor data may be generated by a computer-augmented environment. The learning platform may generate repeat event records based on the events, each of the repeat event records associated with at least one of the user tokens, the repeat event records comprising occurrence frequency metrics, each of the occurrence frequency metrics indicative of a quantity of occurrences of repeated actions, such as physical actions, captured by a sensor in the computer-augmented environment. The learning platform may cluster, based on a clustering framework, the repeat event records into repeat event clusters, the repeat event clusters comprising respective groups of repeat event records. The learning platform may determine filter ranges for the repeat event clusters, the filter ranges comprising separate numerical ranges for each of the repeat event clusters. The learning platform may generate a binarization filter comprising instructions to determine an input occurrence frequency metric is included in at least one of the filter ranges and generate a binary sequence indicative of the at least one of the filter ranges. The learning platform may execute the binarization filter to generate a plurality of binary sequences based on the occurrence frequency metrics of the repeat event records. The learning platform may train a prediction model based on the binary sequences, the prediction model configured to identify a subsequent event based on at least one of the binary sequences. The learning platform may deploy the binarization filter and the prediction model to a real-time platform in communication with the computer-augmented environment.

A second aspect may include the learning platform of the first aspect, wherein, to deploy the binarization filter and the prediction model, the learning platform may generate deployment parameters comprising the binarization filter and the prediction model, and transmit the deployment parameters to the real-time platform.

A third aspect may include the learning platform of any previous aspects, wherein the clustering framework may perform clustering based on unsupervised machine learning. The prediction model may include a supervised machine-learning model.

A fourth aspect may include the learning platform of any previous aspects, wherein the learning platform is further configured to generate an action definition comprising an association between the subsequent event and an action message, the action message comprising display content for the computer-augmented environment; and deploy the action definition to the real-time platform, the real-time platform configured to generate a binary feature based on the binary filter, forecast the subsequent event based on the binary feature and the prediction model, determine the action message in response to forecasting the subsequent event, and cause the computer-augmented environment to display the display content of the action message.

A fifth aspect may include the learning platform of any previous aspects, wherein to generate repeat event records based on the events, the learning platform may further identify, from a historical database, a first event associated with an event type and an event time; select a plurality of subsequent events in response to respective event times of the subsequent events being greater than the event time of the first event and the subsequent events being associated with the event type; and generate an event record, wherein an occurrence frequency metric of the event record comprises a quantity of the first event and the subsequent events.

A sixth aspect may include the learning platform of any previous aspects, wherein after deploying the binarization filter and the prediction model to a real-time platform, the learning platform is further configured to regenerate the binarization filter in response to receipt of new sensor data; retrain the prediction model in response to regenerating the binarization filter; and redeploy the binarization filter and the prediction model to the real-time platform.

A seventh aspect may include the learning platform of any previous aspects, wherein to execute the binarization filter, the learning platform is further configured to determine an occurrence frequency metric of a repeat event record is included in a first filter range of the filter ranges and not in a second filter range of the filter ranges; and generate the binarization sequence comprising a first binary value and a second binary value, the first binary value indicative of the occurrence frequency metric being included in the first filter range and the second binary value indicative of the occurrence frequency metric not being included in the second filter range.

An eighth aspect may include the learning platform of any previous aspects, wherein the binarization filter further comprises instructions to: determine the input occurrence frequency metric is included in a first filter range of the filter ranges and not in a second filter range of the filter ranges; and generate the binarization sequence comprising a first binary value and a second binary value, the first binary value indicative of the input occurrence frequency metric being included in the first filter range and the second binary value indicative of the occurrence frequency metric not being included in the second filter range.

A ninth aspect of the system may include a real-time platform. The ninth aspect may include any of the previous aspects. The real-time platform may receive deployment parameters comprising a binarization filter and a prediction model, the binarization filter comprising a plurality of filter ranges and the prediction model trained based on associations between binary sequences and subsequent events. The real-time platform may receive real-time sensor data generated by a computer-augmented environment. The real-time platform determine a repeat event record based on the real-time sensor data, the repeat event record comprising an occurrence frequency metric, the occurrence frequency metric representative of a number of times an event derived from the real-time sensor data is repeated. The real-time platform generate, based on the binarization filter and the occurrence frequency metric, a binary sequence indicative of the occurrence frequency metric being included in at least one of the filter ranges. The real-time platform determine, based on the prediction model and the binary sequence, at least one of the subsequent events is associated with the binary sequence. The real-time platform identify an action message associated with the at least one of the subsequent events. The real-time platform cause the computer-augmented environment to display the action message before the at least one of the subsequent events occurs.

A tenth aspect may include any of the previous aspects, wherein to determine the repeat event record based on the real-time sensor data, the real-time platform is further configured to: identify a first event based on the real-time sensor data; identify at least one additional event based on the real-time sensor data, the at least one additional event occurring after the first event; determine the first event and at least one subsequent event are associated with a same event type; and generate the repeat event record in response to the first event and the at least one additional event being associated with the same event type.

An eleventh aspect may include any of the previous aspects, wherein the real-time platform is further configured to determine the event based on the real-time sensor data, the event associated with an event type; and select, from a repository, the binarization filter associated with the event type, the repository comprising a plurality of binarization filters respectively associated with event types.

A twelfth aspect may include any of the previous aspects, wherein the real-time platform is further configured to generate a first binary value indicative of the occurrence frequency metric being included in a first filter range; generate a second binary value indicative of the occurrence frequency metric not being included in a second filter range; and combine the first and the second binary value to generate the binary sequence.

A thirteenth aspect may include any of the previous aspects, wherein to identify the action message associated with the at least one of the subsequent events, the real-time platform is further configured to identify an event type associated with the at least one of the subsequent events; access an action repository comprising a plurality of action messages respectively mapped to event types; and select the action message in response to the event type for the subsequent event being mapped to the action message in the action repository.

A fourteenth aspect may include any of the previous aspects, wherein the real-time platform is further configured to map the real-time sensor data to a user token; transmit the real-time sensor data and the user token to a learning platform, the learning platform configured to generate an updated binarization filter and an updated prediction model in response to receipt of the real-time sensor data; receive, from the learning platform, the updated binarization filter and the updated prediction model; replace the binarization filter with the updated binarization filter; and replace the prediction model with the updated prediction model.

What is claimed is:

1. A method, comprising:
   receiving events derived from historical sensor data, the events respectively associated with user tokens;
   generating repeat event records based on the events, each of the repeat event records associated with at least one of the user tokens, the repeat event records comprising occurrence frequency metrics, each of the occurrence frequency metrics indicative of a quantity of occurrences of repeated actions;
   clustering, based on a clustering framework, the repeat event records into repeat event clusters, the repeat event clusters comprising respective groups of repeat event records;
   determining filter ranges for the repeat event clusters, the filter ranges comprising separate numerical ranges for each of the repeat event clusters;
   generating a binarization filter comprising instructions to determine an input occurrence frequency metric is included in at least one of the filter ranges and generate a binary sequence indicative of the at least one of the filter ranges;
   executing the binarization filter to generate a plurality of binary sequences based on the occurrence frequency metrics of the repeat event records;
   training a prediction model based on the binary sequences, the prediction model configured to identify a subsequent event based on at least one of the binary sequences; and
   deploying the binarization filter and the prediction model to a real-time platform.

2. The method of claim 1, wherein deploying the binarization filter and the prediction model further comprises:
   generating deployment parameters comprising the binarization filter and the prediction model; and transmitting the deployment parameters to the real-time platform.

3. The method of claim 1, wherein the clustering framework performs clustering based on unsupervised machine learning, and wherein the prediction model comprises a supervised machine-learning model.

4. The method of claim 1, further comprising:
generating an action definition comprising an association between the subsequent event and an action message, the action message comprising display content for a computer-augmented environment; and
deploying the action definition to the real-time platform, the real-time platform configured to generate a binary feature based on the binary filter, forecast the subsequent event based on the binary feature and the prediction model, determine the action message in response to forecasting the subsequent event, and cause the computer-augmented environment to display the display content of the action message.

5. The method of claim 1, wherein generating repeat event records based on the events further comprises:
identifying, from a historical database, a first event associated with an event type and an event time;
selecting a plurality of subsequent events in response to respective event times of the subsequent events being greater than the event time of the first event and the subsequent events being associated with the event type; and
generating an event record, wherein an occurrence frequency metric of the event record comprises a quantity of the first event and the subsequent events.

6. The method of claim 1, wherein after deploying the binarization filter and the prediction model to a real-time platform, the method further comprises:
regenerating the binarization filter in response to receipt of new sensor data;
retraining the prediction model in response to regenerating the binarization filter; and
redeploying the binarization filter and the prediction model to the real-time platform.

7. The method of claim 1, wherein executing the binarization filter further comprises:
determining an occurrence frequency metric of a repeat event record is included in a first filter range of the filter ranges and not in a second filter range of the filter ranges; and
generating the binarization sequence comprising a first binary value and a second binary value, the first binary value indicative of the occurrence frequency metric being included in the first filter range and the second binary value indicative of the occurrence frequency metric not being included in the second filter range.

8. The method of claim 1, wherein the historical data comprises historical sensor data generated by a computer-augmented environment, the repeated actions comprise repeated physical actions captured by a sensor in the computer-augmented environment, and the real-time platform is in communication with the computer-augmented environment.

9. A system, comprising:
a processor, the processor configured to:
receive events derived from historical sensor data, the events respectively associated with user tokens, the historical sensor data generated by a computer-augmented environment;
generate repeat event records based on the events, each of the repeat event records associated with at least one of the user tokens, the repeat event records comprising occurrence frequency metrics, each of the occurrence frequency metrics indicative of a quantity of occurrences of repeated physical actions captured by a sensor in the computer-augmented environment;
cluster, based on a clustering framework, the repeat event records into repeat event clusters, the repeat event clusters comprising respective groups of repeat event records;
determine filter ranges for the repeat event clusters, the filter ranges comprises separate numerical ranges for each of the repeat event clusters;
generate a binarization filter comprising instructions to determine an input occurrence frequency metric is included in at least one of the filter ranges and generate a binary sequence indicative of the at least one of the filter ranges;
execute the binarization filter to generate a plurality of binary sequences based on the occurrence frequency metrics of the repeat event records;
train a prediction model based on the binary sequences, the prediction model configured to identify a subsequent event based on at least one of the binary sequences; and
deploy the binarization filter and the prediction model to a real-time platform in communication with the computer-augmented environment.

10. The system of claim 8, wherein the processor configured to deploy the binarization filter and the prediction model further comprises the processor configured to:
generate deployment parameters comprising the binarization filter and prediction model; and
transmit the deployment parameters to the real-time platform.

11. The system of claim 9, further comprising the processor configured to:
generate an action definition comprising an association between the subsequent event and an action message, the action message comprising display content for the computer-augmented environment; and
deploy the action definition to the real-time platform, the real-time platform configured to generate a binary feature based on the binary filter, forecast the subsequent event based on the binary feature and the prediction model, determine the action message in response to forecasting the subsequent event, cause the computer-augmented environment to display the display content of the action message.

12. The system of claim 9, wherein the processor configured to generate repeat event records based on the events further comprises the processor configured to:
identify, from a historical database, a first event associated with an event type and an event time;
select a plurality of subsequent events in response to respective event times of the subsequent events being greater than the event time of the first event and the subsequent events being associated with the event type; and
generate an event record, wherein the occurrence frequency metric of the event record comprises a quantity of the first event and the subsequent events.

13. The system of claim 9, wherein after deploy the binarization filter and the prediction model to a real-time platform, the processor is further configured to:
regenerate the binarization filter in response to receipt of new sensor data;

retrain the prediction model in response to regenerating the binarization filter; and redeploy the binarization filter and the prediction model to the real-time platform.

14. The system of claim 9, wherein the binarization filter further comprises instructions executable by the processor to:

determine the input occurrence frequency metric is included in a first filter range of the filter ranges and not in a second filter range of the filter ranges; and generate the binarization sequence comprising a first binary value and a second binary value, the first binary value indicative of the input occurrence frequency metric being included in the first filter range and the second binary value indicative of the occurrence frequency metric not being included in the second filter range.

15. A system comprising a processor, the processor configured to:

receive deployment parameters comprising a binarization filter and a prediction model, the binarization filter comprising a plurality of filter ranges and the prediction model trained based on associations between binary sequences and subsequent events;

receive real-time sensor data generated by a computer-augmented environment;

determine a repeat event record based on the real-time sensor data, the repeat event record comprising an occurrence frequency metric, the occurrence frequency metric representative of a number of times an event derived from the real-time sensor data is repeated;

generate, based on the binarization filter and the occurrence frequency metric, a binary sequence indicative of the occurrence frequency metric being included in at least one of the filter ranges;

determine, based on the prediction model and the binary sequence, at least one of the subsequent events is associated with the binary sequence;

identify an action message associated with the at least one of the subsequent events; and cause the computer-augmented environment to display the action message before the at least one of the subsequent events occurs.

16. The system of claim 15, wherein to determine the repeat event record based on the real-time sensor data, the processor is further configured to:

identify a first event based on the real-time sensor data;

identify at least one additional event based on the real-time sensor data, the at least one additional event occurring after the first event;

determine the first event and at least one subsequent event are associated with a same event type; and generate the repeat event record in response to the first event and the at least one additional event being associated with the same event type.

17. The system of claim 15, wherein the processor is further configured to:

determine the event based on the real-time sensor data, the event associated with an event type; and select, from a repository, the binarization filter associated with the event type, the repository comprising a plurality of binarization filters respectively associated with event types.

18. The system of claim 15, where to determine, based on the prediction model and the binary sequence, the at least one of the subsequent events is associated with the binary sequence, the processor is further configured to:

generate a first binary value indicative of the occurrence frequency metric being included in a first filter range;

generate a second binary value indicative of the occurrence frequency metric not being included in a second filter range; and combine the first and the second binary value to generate the binary sequence.

19. The system of claim 15, wherein to identify the action message associated with the at least one of the subsequent events, the processor is further configured to:

identify an event type associated with the at least one of the subsequent events;

access an action repository comprising a plurality of action messages respectively mapped to event types; and select the action message in response to the event type for the subsequent event being mapped to the action message in the action repository.

20. The system of claim 15, wherein the processor is further configured to:

map the real-time sensor data to a user token;

transmit the real-time sensor data and the user token to a learning platform, the learning platform configured to generate an updated binarization filter and an updated prediction model in response to receipt of the real-time sensor data;

receive, from the learning platform, the updated binarization filter and the updated prediction model;

replace the binarization filter with the updated binarization filter; and replace the prediction model with the updated prediction model.

* * * * *